United States Patent
Wang et al.

(10) Patent No.: US 12,497,652 B2
(45) Date of Patent: Dec. 16, 2025

(54) SYSTEM AND METHODS FOR HIGH THROUGHPUT SCREENING OF TISSUE PREPARATION CONDITIONS

(71) Applicant: AtlasXomics Inc., New York, NY (US)

(72) Inventors: Kenneth Wang, New York, NY (US); Rong Fan, Cheshire, CT (US); Joseph C. Gennaro, New Haven, CT (US); Colin Ng, New Haven, CT (US); Matthew Eastman, Woodbridge, CT (US); Gumaro Rojas, New Haven, CT (US); Sydney Rossi, Milford, CT (US); Jose Perez, New Haven, CT (US); Molly Wetzel, New Haven, CT (US); Zev Kartiganer, Easton, CT (US)

(73) Assignee: AtlasXomics Inc., New York, NY (US)

( * ) Notice: Subject to any disclaimer, the term of this patent is extended or adjusted under 35 U.S.C. 154(b) by 693 days.

(21) Appl. No.: 17/960,007

(22) Filed: Oct. 4, 2022

(65) Prior Publication Data

US 2023/0139059 A1    May 4, 2023

Related U.S. Application Data

(60) Provisional application No. 63/252,091, filed on Oct. 4, 2021.

(51) Int. Cl.
*G01N 1/00* (2006.01)
*C12Q 1/6841* (2018.01)
*G01N 33/68* (2006.01)

(52) U.S. Cl.
CPC ....... *C12Q 1/6841* (2013.01); *G01N 33/6875* (2013.01); *C12Q 2600/16* (2013.01)

(58) Field of Classification Search
None
See application file for complete search history.

(56) References Cited

U.S. PATENT DOCUMENTS

| | | | |
|---|---|---|---|
| 10,071,377 B2 * | 9/2018 | Bharadwaj | B01L 3/502784 |
| 2020/0152289 A1 | 5/2020 | Cleary et al. | |
| 2021/0095331 A1 | 4/2021 | Fan et al. | |
| 2022/0073974 A1 | 3/2022 | Gennaro | |

FOREIGN PATENT DOCUMENTS

| | | |
|---|---|---|
| WO | 2017/172762 A1 | 10/2017 |
| WO | 2019/113506 A1 | 6/2019 |
| WO | 2019/178164 A1 | 9/2019 |
| WO | 2020/047004 A2 | 3/2020 |
| WO | 2020/123309 A1 | 6/2020 |
| WO | 2021/091611 A1 | 5/2021 |

(Continued)

OTHER PUBLICATIONS

Liu et al., "High-Spatial-Resolution Multi-Omics Sequencing via Deterministic Barcoding in Tissue", Cell, vol. 183, No. 6, Dec. 10, 2020, pp. 1665-1681.

(Continued)

*Primary Examiner* — Jyoti Nagpaul
(74) *Attorney, Agent, or Firm* — YHE Law LLP

(57) ABSTRACT

The present disclosure relates generally to systems and methods for screening sample preparation conditions and, more specifically, high throughput screening of tissue sample preparation conditions.

16 Claims, 22 Drawing Sheets
(15 of 22 Drawing Sheet(s) Filed in Color)

(56) References Cited

FOREIGN PATENT DOCUMENTS

| WO | 2022/051669 A1 | 3/2022 |
|---|---|---|
| WO | 2023/059658 A1 | 4/2023 |

OTHER PUBLICATIONS

International Preliminary Report on Patentability received for PCT Patent Application No. PCT/US2021/049148, mailed on Mar. 7, 2023, 7 pages.
International Search Report and Written Opinion received for PCT Patent Application No. PCT/US2021/049148, mailed on Nov. 24, 2021, 10 pages.
International Search Report and Written Opinion received for PCT Patent Application No. PCT/US2022/045698, mailed on Jan. 27, 2023, 15 pages.
Non-Final Office Action received for U.S. Appl. No. 17/466,911, mailed on Apr. 11, 2023, 23 pages.
Office Action received for European Patent Application No. 21790312.9, mailed on Apr. 13, 2023, 3 pages.
Cao et al., "Comprehensive single-cell transcriptional profiling of a multicellular organism", Science 357, Aug. 18, 2017, 661-667.
Crosetto et al., "Spatially resolved transcriptomics and beyond", Nature Review Genetics, vol. 16, Jan. 2015, pp. 57-66.
Liu et al., "High-Spatial-Resolution Multi-Omics Atlas Sequencing of Mouse Embryos via Deterministic Barcoding in Tissue", Oct. 1, 2019, 55 pages.
Rory et al., "RNA sequencing: the teenage years", Nature Review Genetics, vol. 20, Nov. 2019, pp. 631-656.
Rosenberg et al., "Single-cell profiling of the developing mouse brain and spinal cord with split-pool barcoding", Science 360, Apr. 13, 2018, 176-182.
Shah et al., "Dynamics and Spatial Genomics of the Nascent Transcriptome by Intron seqFISH", vol. 174, No. 2, Retrieved from the Internet:—https://www.sciencedirect.com/science/article/pii/S0092867418306470, Jul. 2018, pp. 363-376.

* cited by examiner

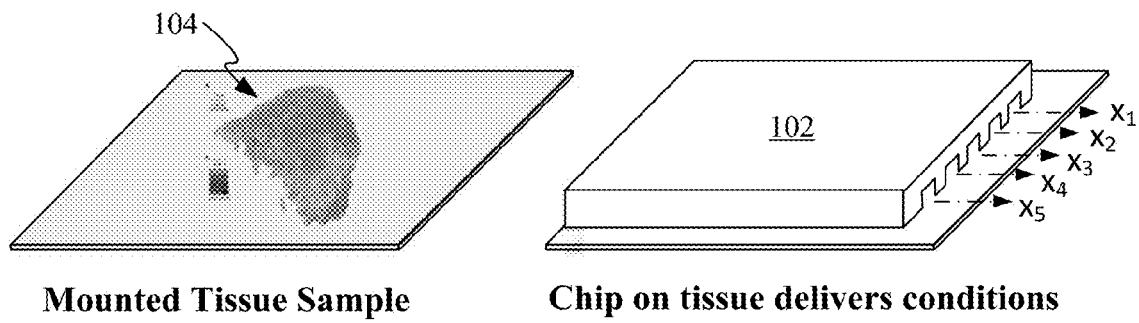
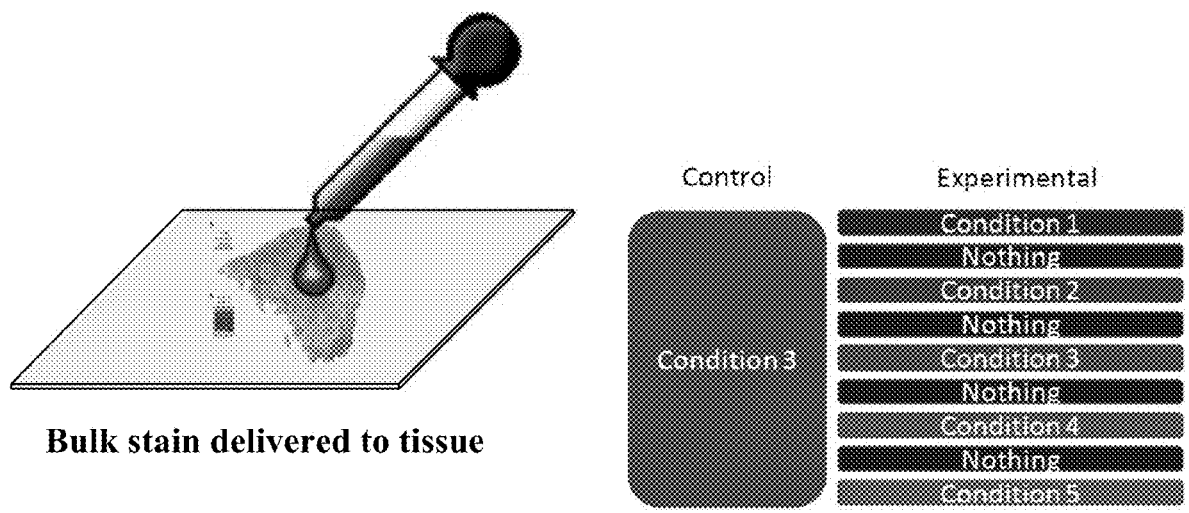
*FIG. 1*

| Con. # | Example panel 1 | Example panel 2 |
|---|---|---|
| 1 | Triton X-100 0.5% | Triton X-100 2% |
| 2 | Triton X-100 0.1% | Triton X-100 1% |
| 3 | Triton X-100 0.01% | Triton X-100 0.5% |
| 4 | Proteinase-K 5ug/mL | Protease IV |
| 5 | Proteinase-K 2ug/mL | Protease III |
| 6 | Proteinase-K 1ug/mL | Protease Plus |
| 7 | Pepsin + collagenase | Proteinase-K 5ug/mL |
| 8 | Collagenase 0.2U/uL | Proteinase-K 2ug/mL |
| 9 | Pepsin 0.1% | Collagenase 0.2U/uL |
| 10 | Pepsin 0.05% | Pepsin 0.03% |

| Channel # | Condition | Channel # | Condition |
|---|---|---|---|
| 1 | 1 | 26 | 6 |
| 2 | 2 | 27 | 7 |
| 3 | 3 | 28 | 8 |
| 4 | 4 | 29 | 9 |
| 5 | 5 | 30 | 10 |
| 6 | 6 | 31 | 1 |
| 7 | 7 | 32 | 2 |
| 8 | 8 | 33 | 3 |
| 9 | 9 | 34 | 4 |
| 10 | 10 | 35 | 5 |
| 11 | 1 | 36 | 6 |
| 12 | 2 | 37 | 7 |
| 13 | 3 | 38 | 8 |
| 14 | 4 | 39 | 9 |
| 15 | 5 | 40 | 10 |
| 16 | 6 | 41 | 1 |
| 17 | 7 | 42 | 2 |
| 18 | 8 | 43 | 3 |
| 19 | 9 | 44 | 4 |
| 20 | 10 | 45 | 5 |
| 21 | 1 | 46 | 6 |
| 22 | 2 | 47 | 7 |
| 23 | 3 | 48 | 8 |
| 24 | 4 | 49 | 9 |
| 25 | 5 | 50 | 10 |

(Color code is arbitrary)

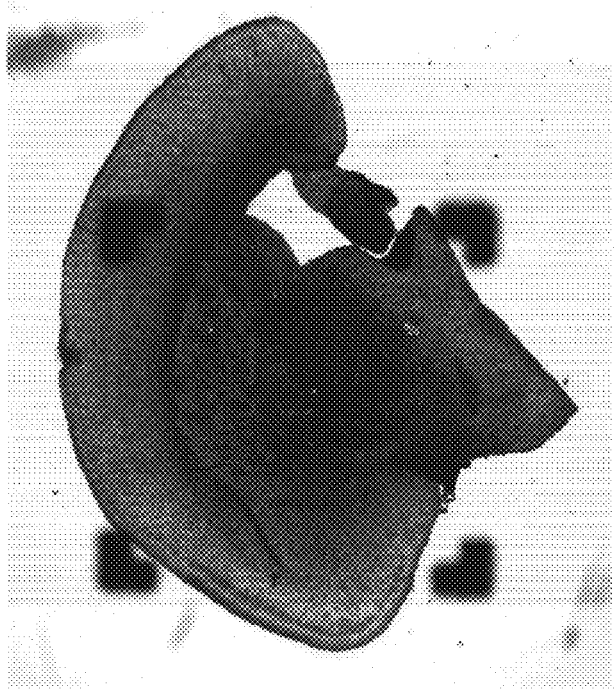

FIG. 2

| Species | Tissue | Fixation Condition | Recommended Permeabilization |
|---|---|---|---|
| Mm | E11 | FF | 0.01% Triton X-100 |
| Mm | E11 | FFPE | 0.5% Tx (neural tube); 1% Tx or 10ug/mL ProtK (mesenchyme, limb bud) |
| Mm | Brain | FF | 1% Tx |
| Mm | Kidney | FF | 2ug/mL ProtK |
| Mm | Brain | FFPE | 2% Tx |
| Hs | Brain | FF | 2% Tx (striatum) |
| Mm | Brain | FFPE | 2% Tx (striatum) |
| Mm | Kidney | FFPE | 1% Tx |
| Hs | FTE HGSC | FFPE | 0.05% Pepsin |

*FIG. 3*

Access018: Mm E11
FAM-primer: oligo$_{dT}$ / scramble

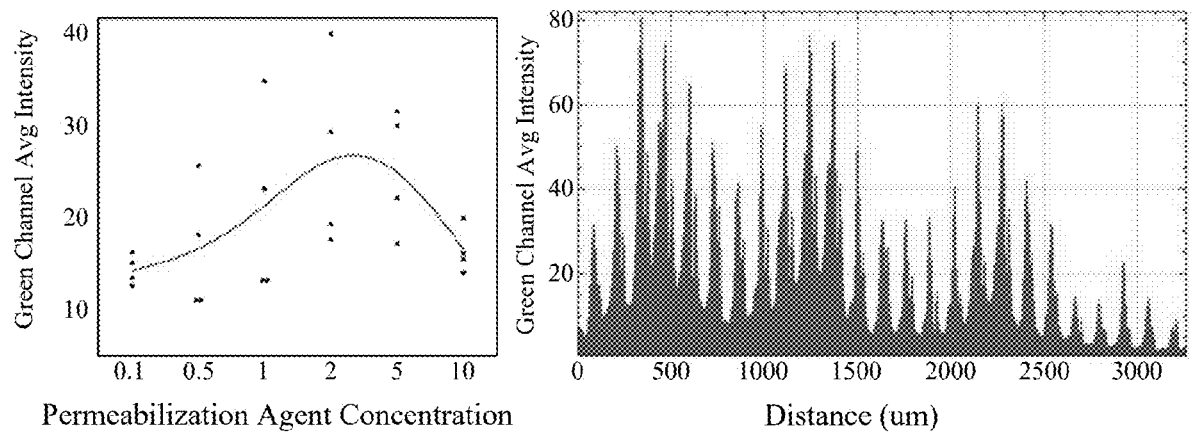
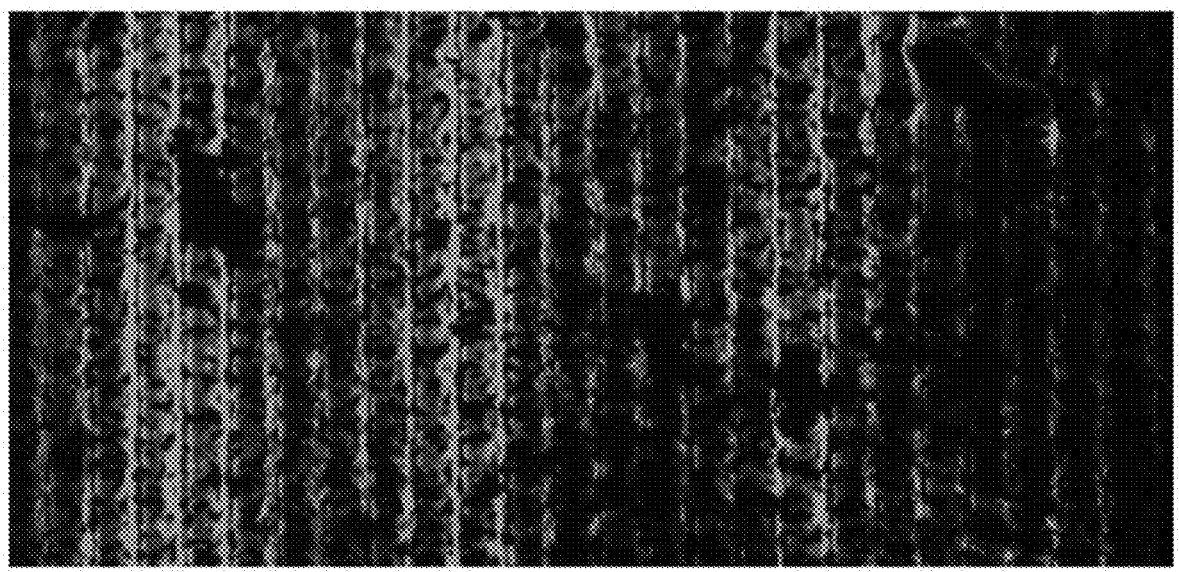
*FIG. 9*

| Replicate | Tx100 Condition | Avg genes/tixel | Avg UMI/tixel |
|---|---|---|---|
| 1 | 0.5% | [Low] | [Low] |
| 2 | 0.5% | [Low] | [Low] |
| 3 | 0.5% | [Low] | [Low] |
| 4 | 2.0% | [High] | [High] |
| 5 | 2.0% | [High] | [High] |
| 6 | 2.0% | [High] | [High] |

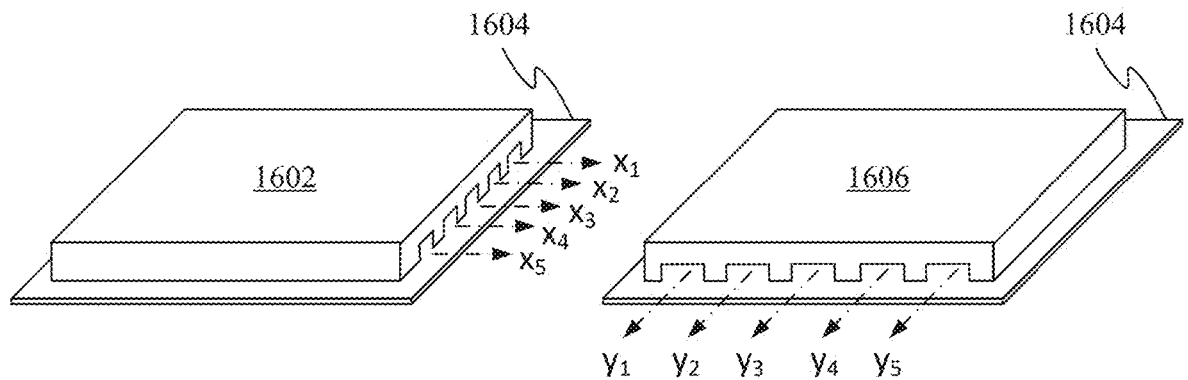
*FIG. 16A*     *FIG. 16B*
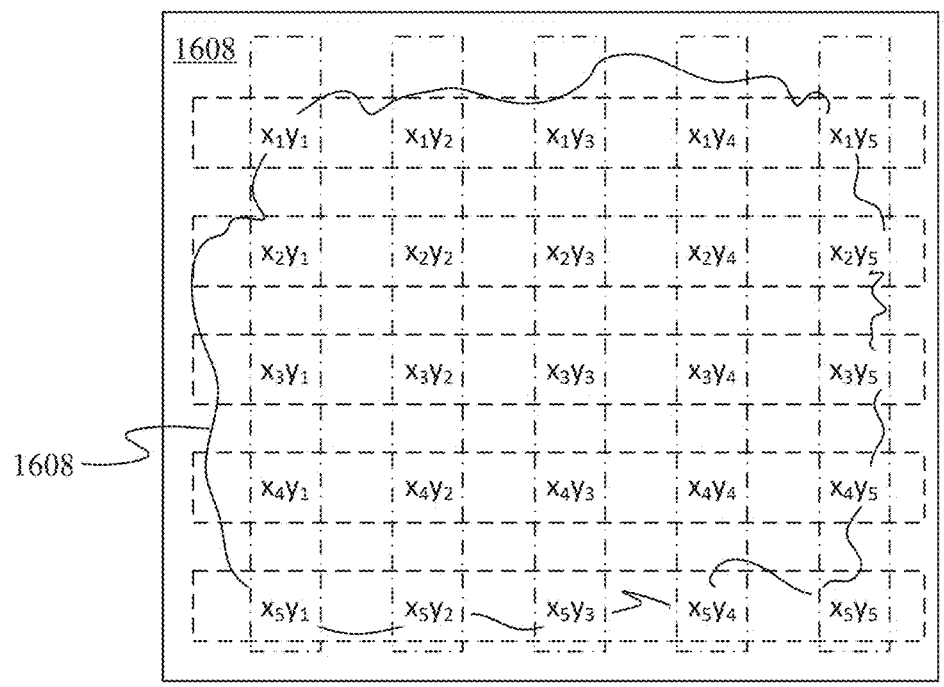
*FIG. 16C*

SYSTEM AND METHODS FOR HIGH THROUGHPUT SCREENING OF TISSUE PREPARATION CONDITIONS

This application claims priority to U.S. Patent Application Ser. No. 63/252,091, entitled "SYSTEM AND METHODS FOR HIGH THROUGHPUT SCREENING OF TISSUE PREPARATION CONDITIONS," filed on Oct. 4, 2021, the content of which is hereby incorporated by reference in its entirety.

GOVERNMENT LICENSE RIGHTS

This invention was made with government support under CA149128 awarded by National Institutes of Health. The government has certain rights in the invention.

FIELD

The present disclosure relates generally to systems and methods for screening sample quality and optimal preparation conditions and, more specifically, high throughput screening of tissue sample preparation conditions as well as the integrity and accessibility of analytes within the tissue sample.

BACKGROUND

Biological assays such as ISH (in situ hybridization), FISH (fluorescence in situ hybridization), DBIT-seq (Deterministic Barcoding in Tissue for spatial omics sequencing), other spatially resolved transcriptomic techniques, IF (immunofluorescence), IHC (immunohistochemistry), scRNA-seq (single-cell RNA sequencing), and snRNA-seq (single nucleus RNA sequencing) can be used to analyze one or more analytes in a tissue sample, both spatially and/or non-spatially. Each of these assays consumes valuable time and resources, including the tissue sample itself. Therefore a rapid, inexpensive and tissue-sample-conserving method for forecasting the amount, quality and accessibility of the data to be produced by the assay, and a method for identifying the optimal assay parameters for maximizing the amount and quality of the data to be produced, would be of significant value to a wide range of practitioners.

SUMMARY

The performance of biological assays such as ISH, FISH, DBIT-seq, scRNA-seq, snRNA-seq, in situ sequencing (ISS), solid-phase capture array-based methods, and many other similar spatial and non-spatial assay techniques can be greatly affected by the amount, quality, and/or accessibility of analyte(s) in tissue samples. Improving and/or optimizing preparation conditions can substantially improve the performance of such assays. The parameter space can, however, include a wide range of condition variables that affect assay performance, often with a great degree of tissue-to-tissue, reagent-to-reagent, and/or analyte-to-analyte variance, making preparation-condition optimization challenging and time-consuming. Variance from lot to lot of reagents from the different or same sources, as well as batch effects even when from the same supplier can also strongly affect assay output. Thus, there is a need for systems and methods for high throughput screening of tissue preparation conditions, sample quality, and reagent performance.

Furthermore, even after the optimal preparation conditions have been identified for a certain subset of tissues, the age of the tissue sample, tissue fixation methods (e.g., fresh-frozen, fresh-fixed, or formalin-fixed, paraffin-embedded), or tissue state (e.g., normal or diseased, cancerous or benign), sample-to-sample preparation variations (such as time between harvesting and freezing/fixation, concentration of fixative, fixation duration, and other variations known to those skilled in the art) can significantly impact analyte amount, quantity, and accessibility, in a spatially heterogeneous manner.

As an example many methods exist for profiling mRNA (messenger RNA, also referred to as transcripts to those skilled in the art) in tissue samples, both spatially and while retaining information about the cell of origin (such as in scRNA-seq). It is critical that the probes designed to bind to mRNA (either to specific species, or via universal primers such as the poly-A (poly-adenylated) tail) gain access to the region of tissue where the transcripts reside (i.e., the interior of the cell or cell nucleus) without disrupting cellular integrity to such a degree that transcripts are released outside each cell thereby destroying information about spatial context or cellular identity. Existing methods in the field prescribe treating entire tissue samples with a single concentration of permeabilization reagent (e.g. surfactants, solvents, protein degradation enzymes, chelators of divalent cations, corrosives, and so forth). The implicit assumption a priori is that there exists a particular reagent concentration that strikes the optimal balance between probe accessibility and analyte integrity, the large available parameter space for the concentrations, which can vary by many orders of magnitude, necessitates the consumption of many tissue samples which can be scarce and precious in certain cases. Combinations of one or more reagents may also need to be evaluated to accurately determine the optimal concentration. To statistically account for sample-to-sample variation, each reagent concentration must be tested on multiple tissue samples. For example, to test ten different concentrations, many dozens of separate experiments would be required to estimate the optimal concentrations, each experiment consuming a single tissue section. The present invention provides a method for simultaneously testing many reagent concentrations on the same tissue section, thereby simultaneously eliminating sample-sample variation.

Further, by appropriately repeating experimental conditions in multiple regions in the same tissue section ("intra-sample replicates"), with the regions containing the replicates distributed throughout the tissue section, local variations in analyte amount and accessibility can be marginalized over, thereby producing at once a detailed map of the spatial variations in analyte amount and accessibility, as well as an average signal for each experimental condition.

In one exemplary embodiment, a method, includes affixing a microfluidic chip having a plurality of channels to a tissue sample such that a first channel of the plurality of channels traverses at least a first region of the tissue sample and a second channel of the plurality of channels traverses at least a second region of the tissue sample; capturing a first image of the microfluidic chip affixed to the tissue sample that shows a position of at least the first channel and the second channel of the plurality of channels relative to the tissue sample; flowing a plurality of reagents through the plurality of channels of the microfluidic chip, wherein flowing the plurality of reagents through the plurality of channels comprises: flowing a first reagent through the first channel, wherein the first reagent interacts with the first region of the tissue sample; and flowing a second reagent through the second channel, wherein the second reagent interacts with the second region of the tissue sample, wherein the first reagent differs from the second reagent and/or a first characteristic of the interaction between the first reagent and the first region differs from a second characteristic of the interaction between the second reagent and the second region; removing the microfluidic chip from the tissue sample; optically marking the tissue sample to identify a quality of the tissue sample and areas in the tissue sample affected by the flow of the plurality of reagents over the tissue sample; capturing a second image of the tissue sample after removing the microfluidic chip; co-registering the first and second images resulting in a separation of the second image into a plurality of image regions, wherein a first image region of the plurality of image regions is a first portion of the second image that includes the first region of the tissue sample and a second image region of the plurality of image regions is a second portion of the second image that includes the second region of the tissue sample; and ranking a performance of the plurality of reagents with the tissue sample based on at least an average brightness of the optical markings captured by one or more image regions of the second image that correspond to a respective reagent of the plurality of reagents.

In another exemplary embodiment, a non-transitory computer-readable storage medium can be implemented that stores one or more programs, where the one or more programs include instructions, which when executed by one or more processors of a electronic system, cause the electronic system to affix a microfluidic chip having a plurality of channels to a tissue sample such that a first channel of the plurality of channels traverses at least a first region of the tissue sample and a second channel of the plurality of channels traverses at least a second region of the tissue sample; capture a first image of the microfluidic chip affixed to the tissue sample that shows a position of at least the first channel and the second channel of the plurality of channels relative to the tissue sample; flow a plurality of reagents through the plurality of channels of the microfluidic chip, wherein flowing the plurality of reagents through the plurality of channels comprises: flowing a first reagent through the first channel, wherein the first reagent interacts with the first region of the tissue sample; and flowing a second reagent through the second channel, wherein the second reagent interacts with the second region of the tissue sample, wherein the first reagent differs from the second reagent and/or a first characteristic of the interaction between the first reagent and the first region differs from a second characteristic of the interaction between the second reagent and the second region; removing the microfluidic chip from the tissue sample; optically mark the tissue sample to identify a quality of the tissue sample and areas in the tissue sample affected by the flow of the plurality of reagents over the tissue sample; capture a second image of the tissue sample after removing the microfluidic chip; co-register the first and second images resulting in a separation of the second image into a plurality of image regions, wherein a first image region of the plurality of image regions is a first portion of the second image that includes the first region of the tissue sample and a second image region of the plurality of image regions is a second portion of the second image that includes the second region of the tissue sample; and rank a performance of the plurality of reagents with the tissue sample based on at least an average brightness of the optical markings captured in one or more image regions of the second image that correspond to a respective reagent of the plurality of reagents.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a better understanding of the various described embodiments, reference should be made to the Description of Embodiments below, in conjunction with the following drawings in which like reference numerals refer to corresponding parts throughout the figures.

FIG. 1 illustrates a high throughput method for screening tissue preparation conditions using a microfluidic chip.

FIG. 2 illustrates the parameters of a 10-plex permeabilization screen across the channels of a 50-channel microfluidic chip.

FIG. 3 illustrates the recommended permeabilization conditions for a range of tissue types, based on permeabilization screens performed using the methods outlined in FIG. 1 and FIG. 2.

FIG. 9 illustrates the results of a 10-plex permeabilization screen in human FF brain tissue.

FIGS. 16A-16C shows steps taken in a two-dimensional multiplexing operation.

DETAILED DESCRIPTION

Figure 4:
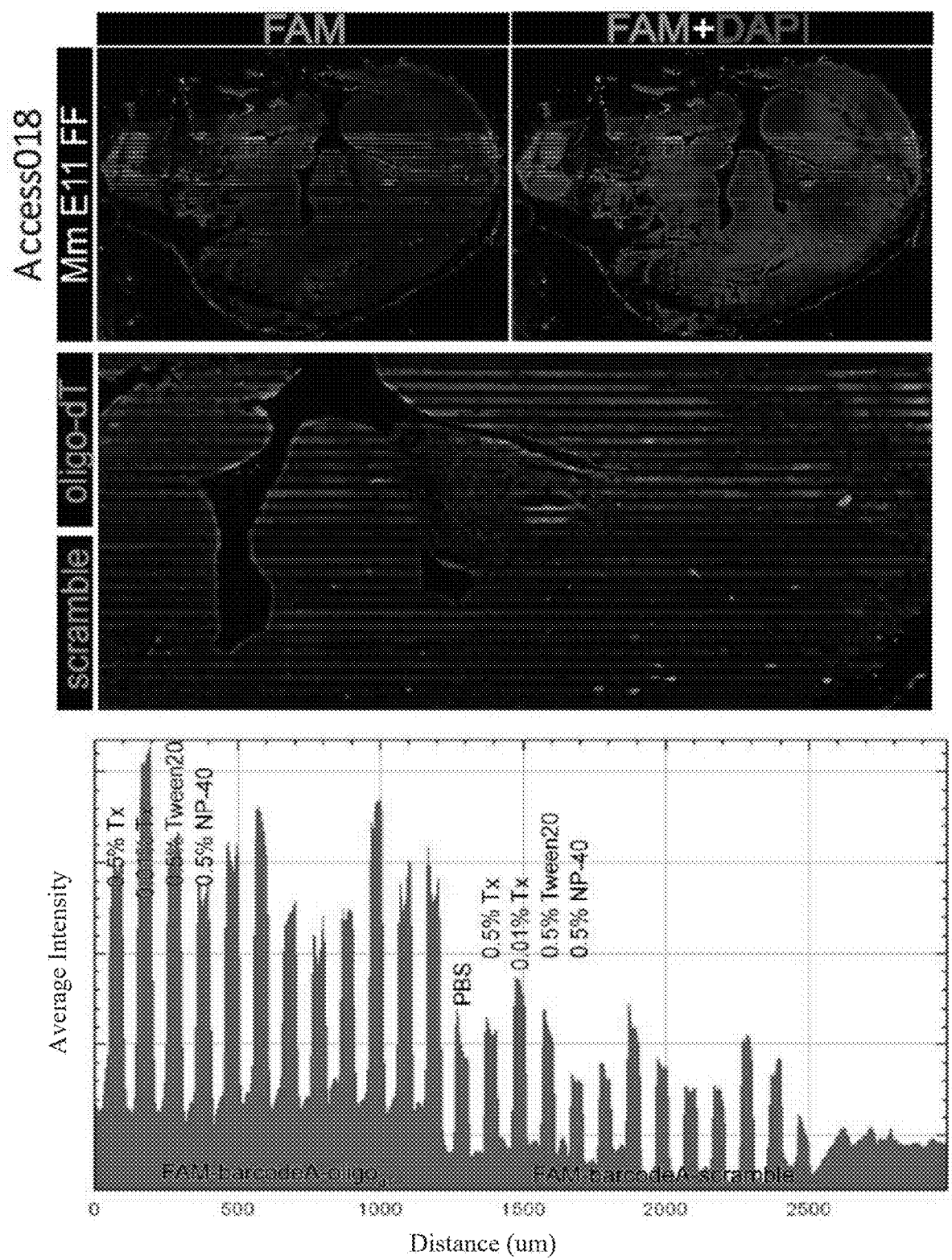
FIG. 4 illustrates labelling of fresh-frozen (FF) mouse E11 samples under different permeabilization conditions.

Certain details are set forth below to provide a sufficient understanding of various embodiments of the invention. However, it will be clear to one skilled in the art that embodiments of the invention can be practiced without one or more of these particular details. Moreover, the particular embodiments of the present invention described herein are provided by way of example and should not be used to limit the scope of the invention to these particular embodiments.

In other instances, hardware components, network architectures, and/or software operations have not been shown in detail in order to avoid unnecessarily obscuring the invention.

There is a need for systems and methods for high throughput screening of tissue sample preparation conditions. For example, there is a need for systems and methods to allow for tissue- and/or analyte-specific preparation-condition optimization in order to improve the sensitivity, accuracy, and applicability of various biological assays and/or reduce the time, cost, and quantity of sample required to perform such assays.

These and other embodiments are discussed below with reference to FIGS. 1-16B. Those skilled in the art, however, will readily appreciate that the detailed description given herein with respect to these figures is for explanatory purposes only and should not be construed as limiting. FIGS. 1-16B and the accompanying text detail exemplary systems, methods, and results relating to the methods described herein for high throughput screening of tissue preparation conditions.

Biological assay performance is greatly affected by the amount, quality, and accessibility of analyte in tissue samples. The systems and methods for high throughput screening of tissue preparation conditions described herein provide a way to rapidly search the large parameter space for tissue preparation in order to determine optimal preparation conditions for a wide array of assays, spatial or otherwise (e.g., DbiT-seq, or other spatially resolved transcriptomic assays, ISH, FISH, IF/IHC, scRNA-seq, snRNA-seq, LMD, LCMD, MIBI).

Spatial-ATAC-seq is one use case of DBiT-seq, a microfluidics based spatial multi-omic profiling platform. Successful profiling of chromatin accessibility in a fresh-frozen (FF) tissue section depends on many factors which this method can help uncover or discover. These critical and Spatial-ATAC-seq is one use case of DBiT-seq, a microfluidics based spatial multi-omic profiling platform. Successful profiling of chromatin accessibility in a fresh-frozen (FF) tissue section depends on many factors which this method can help uncover or discover. These critical and uncoverable or discoverable factors include but are not limited to: (1) Tissue state. The sought-after chromatin accessibility signal must be preserved from the original tissue state before resection all the way through resection, snap freezing, OCT embedding, storage, transport, re-freezing, thawing, and fixation, else the downstream assay will have insufficient signal to recover. Since many of the handling variables are pre-analytical (that is, unmeasured or not practically measurable), tissue (even from one modality, in this cased fresh-frozen) must be treated has having a variety of hidden variables which must be discovered in order to successfully carry out sensitive downstream assays such as spatial-ATAC-seq; (2) Active enzyme concentration and incubation time. The sought-after signal is recovered by means of tagmentation with a key enzyme Tn5. Since the mechanism is stochastic in nature, both under- and over-tagmentation can lead to assay failure. Two of the factors affecting the amount of tagmentation are Tn5 concentration and incubation time. (3) Permeabilization reagent and concentration and incubation time-since the enzymatic activity and spatial barcoding require transport of enzymes and barcodes inside the nuclear envelope of cells, the type and amount of permeabilization can crucially affect both steps. Insufficient permeabilization can lead to under-tagmentation or inefficient spatial barcoding Meanwhile, hyper-permeabilization can lead to improper movement of target chromatin regions around the tissue.

The optimal values for the active enzyme concentration and incubation times as well as for the permeabilization reagent and concentration and incubation times depend not only on tissue type, but also on the pre-analytical variables inherent to tissue handling. Suppose that optimal workflow parameters are discovered for fresh-frozen adult mouse brain tissue from a particular tissue source. It is tempting, but false, to assume that these workflow parameters will prove optimal for all future fresh-frozen adult mouse brain tissue samples. In fact, the multitude of pre-analytical variables (perhaps including but not limited to the exact amount of time between recovery from the donor and snap-freezing in isopentane, or the amount of time the sample spends on the cryostat at a slightly elevated temperature) appears to result in variable optimal workflow parameters, such that even two tissues from the same commercial source, harvested in similar conditions, shipped in the same box, and subjected to identical treatment during application of DBiT-seq, can result in wildly different results.

While it is possible in principle to optimize these interacting parameters by testing every tissue section with a full spatial-ATAC-seq assay, it is not economical. Suppose a particular tissue source generates three (unknown) types of tissue: bad, medium, and good tissue, and there are three Tn5 conditions (low, medium, high concentration), and three permeabilization conditions (reagent 1, reagent 2, and reagent 3), then there exist $3 \times 3 \times 3 = 27$ combinations of the three parameters.

Next-generation sequencing (NGS)-based techniques such as spatial-ATAC-seq often cost thousands of dollars per sample; meanwhile fluorescence microscopy-based techniques describe herein cost approximately two or three hundreds of dollars per attempt. Further, each un-multiplexed assay only probes one grid point per experiment. Meanwhile, each multiplexed assay can probe 2, 5, 10, 50, or more per grid point. A typical value is 5 conditions (e.g., 5 permeabilization conditions per assay), so let us work through an example assuming each multiplexed assay can probe 5 grid points simultaneously (see Table (1) below).

TABLE (1)

| Number of grid points | Statistical power desired | Number of conditions | Cost to optimize with spatial-ATAC-seq ($2k per experiment, one grid point per experiment) | Cost to optimize with multiplexing ($200 per experiment, 5 grid points per experiment) |
| --- | --- | --- | --- | --- |
| 27 | 3 | 81 | $162,000 | $3,240 |
| 27 | 10 | 270 | $540,000 | $10,800 |
| 27 | 30 | 810 | $1,620,000 | $32,400 |

Thus, depending on the cost of the downstream assay (in this case assumed to be $2,000 per assay), it would cost potentially millions of dollars to optimize one omics tool (DBIT-seq) for one tissue source. Clearly some way of economically probing this phase space is called for.

With appropriate inter-sample calibration, the systems and methods for high throughput screening of tissue preparation conditions described herein can also serve as a Quality Control assay to forecast the quality of data generated from tissue samples using a variety of spatial assays, without actually performing the full assay or consuming multiple tissue sections, thereby speeding research, reducing optimization time and cost, and conserving precious tissue.

The systems and methods for high throughput screening of tissue preparation conditions described herein enable highly-multiplexed screening of tissue pre-treatment (upstream of nearly any biological analysis, on either mounted tissue sections, or cultured cells, or organoids . . . ) conditions by using a microfluidic device to spatially deliver reagents to specific geometric areas of a tissue section. In one embodiment, a microfluidic chip with between 10 and 50 channels with channel width and pitch between 25 µm and 100 µm is assembled on top of a tissue section mounted on a glass slide subjected to one of a wide choice of fixation methods (e.g. FF tissue fixed in 4% paraformaldehyde). The tissue is then further treated (e.g. permeabilized) to enhance analyte accessibility. In this invention, a series of reagents are loaded into the device, such that upon flow, each channel will deliver subject a specific region of the tissue interfacing with the channel to a certain condition (e.g. different permeabilization agents, or different concentrations of permeabilization agents). The experimenter is free to utilize the channels of the device to assemble any combination of conditions, including non-adjacent replicates arranged so as to marginalize over biological variation in the tissue section (sometimes referred to here as a "ladder" or "titration" or "high-plex screen with replicates"). For example, the experimenter can choose to repeat 10 different reagents 5 times in a 50 channel chip, with each set of 10 grouped together in a repeating ladder. In some embodiments, the chip is a chip described in, or having one or more features of the chips described in: Liu Y, Yang M, Deng Y, Su G, Enninful A, Guo C C, Tebaldi T, Zhang D, Kim D, Bai Z, Norris E, Pan A, Li J, Xiao Y, Halene S, Fan R. *High-Spatial-Resolution Multi-Omics Sequencing via Deterministic Barcoding in Tissue*. Cell. 2020 Dec. 10; 183 (6): 1665-1681.e18. doi: 10.1016/j.cell.2020.10.026. Epub 2020 Nov. 13. PMID: 33188776; PMCID: PMC7736559.

FIG. 1 illustrates a high throughput method for screening tissue preparation conditions using a microfluidic chip 102. With reference to FIG. 1, we have generated preliminary high throughput screening of tissue preparation conditions data by varying permeabilization conditions in the channels of microfluidic chip 102 interfaced with mouse and human fresh frozen tissue sections 104, showing that stain uptake does vary with permeabilization condition. While this example mentions the use of mouse and human fresh frozen tissue sections it should be appreciated that any number of different tissue sample types could work with the described embodiments. For example, the types can also include but are not limited to fetal rat, chicken embryo, zebrafish embryo, and several other species. The organs or tissue regions known to be compatible with the described embodiments include but are not limited to brain (various regions), skin, intestine/polyp, heart, ovary, breast, skeletal muscle, bone marrow, retina, liver, kidney, pancreas, including both normal and cancerous tissue in many cases. Any tissue that can be retained on a suitably coated glass slide is in principle compatible with the embodiments described herein. It should be noted that microfluidic chip 102 would typically use 50 um channels but any width channel in principle could be used. In some embodiments, a 2-D assay could be performed using two crossed chips as in DBIT. Furthermore stain could be delivered to the tissue in channels of a microfluidic chip if desired (e.g. could vary stain itself across channels). Finally, 4% PFA is typically used for fixing tissue 104 in place but fixing tissue 104 in place could be done in a number of different ways.

In one embodiment, an experimenter could flow different concentrations of Triton X-100, a surfactant, as well as other enzymes and surfactants across a fixed tissue sample 104. We varied the permeabilization conditions in a batched manner in the channels (see next figure), then incubated the tissue. We then performed a secondary staining step. In this case (without a chip) applied, to the entire sample, a pan-mRNA stain: oligo-dT (a synthetically assembled polymer of consecutive thymine base pairs) conjugated to 5 (6)-Carboxyfluorescein (FAM), a green fluorescent dye. We then incubated to allow the oligo-dT to hybridize to poly-A sites on 3' end of mRNA. We then washed the tissue to remove unbound probes. Since the tissue has been differentially permeabilized, the uptake of the stain varies with the permeabilization condition, and therefore by channel number.

The fluorescent intensities of the tissue underneath the various channels is grouped by permeabilization condition and averaged to produce a high-statistics, tissue-density-independent measurement of intensity as a function of permeabilization condition marginalized over biological variation in the sample. These condition-specific intensities are then compared amongst one another. These measured intensities quantitatively characterize both analyte quantity, and the accessibility of those analytes to the fluorescent staining procedure used. Since each of the fluorescent readings are performed in the same imaging sweep, variability between runs owing to changes in light conditions, camera settings, etc. is minimized (although this limitation is removed in certain embodiments). Tissue usage, experiment cost, and hands on time are all greatly improved relative to the state of the art.

FIG. 2 illustrates the parameters of a 10-plex permeabilization screen across the channels of a 50-channel microfluidic chip. In many of the following data sets, a 10-plex permeabilization screen (such as the one shown in FIG. 2, with some variation from experiment-to-experiment) was employed, with each condition repeated 5 times in geometrically disparate channels. This was done to minimize the impact on the readout of spatial variation in tissue density, which could otherwise confound the results.

FIG. 3 illustrates the recommended permeabilization conditions for a range of tissue types, based on permeabilization screens as outlined in FIG. 1 and FIG. 2. The systems and methods for high throughput screening of tissue preparation conditions described herein have allowed us to efficiently optimize permeabilization conditions for a number of tissue types and fixation conditions. The readout is correlative with cDNA library size/quality in human brain tissue.

FIG. 4 illustrates labelling of fresh-frozen mouse embryo samples under different permeabilization conditions. FAM-conjugated oligo$_{dT}$ primer differentially labels mRNA under different detergent permeabilization conditions in fresh-frozen mouse embryo.

A multiplexed screen of 4 permeabilization conditions was flowed over Mouse (fresh-frozen) FF embryo thawed then fixed in 4% formaldehyde. It was then stained with FAM-oligodT or FAM-scramble, and (4',6-diamidino-2-phenylindole) (DAPI) to highlight nuclei. The mRNA-binding fluorophore (FAM-oligodT) provided a measurable increase in average brightness over the FAM-scramble control. The condition that enabled highest analyte accessibility was Triton X-100 (0.01%). This is consistent with our findings that FF *Mus musculus* (Mm) embryo does not require extensive permeabilization to enable mRNA probes to bind to poly A binding sites.

Figure 5:
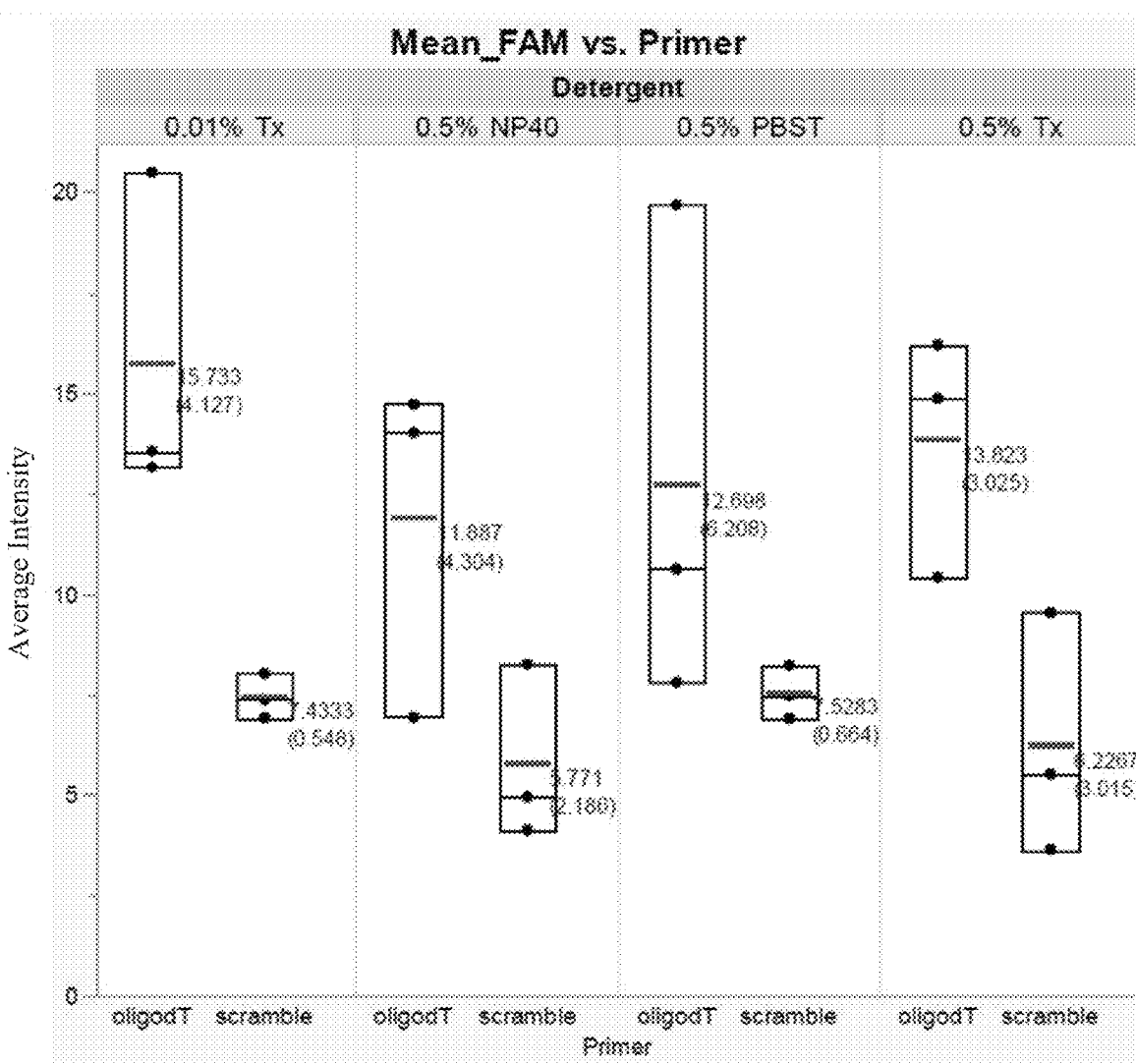
FIG. 5 illustrates the results of labelling of fresh-frozen (FF) mouse E11 samples under different permeabilization conditions.

FIG. 5 illustrates the results of labelling of fresh-frozen mouse embryo samples under different permeabilization conditions. On Mm FF embryo, out of four permeabilization conditions, Triton X-100 0.01% resulted in the greatest barcode uptake, and the FAM-conjugated oligodT primer specifically labels mRNA.

Figure 6A:
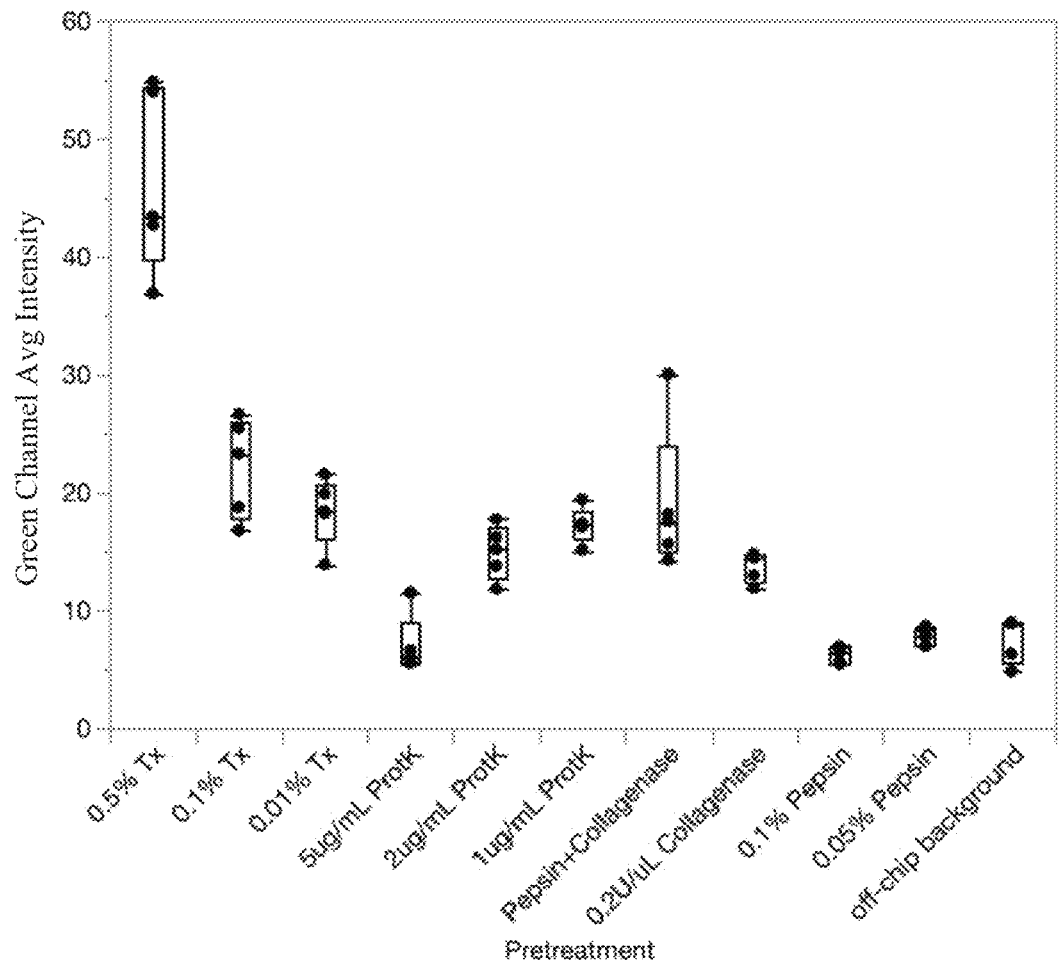
FIGS. 6A-6B illustrate the results of 10-plex permeabilization screen for FF human cerebellum tissue.
Figure 6B:
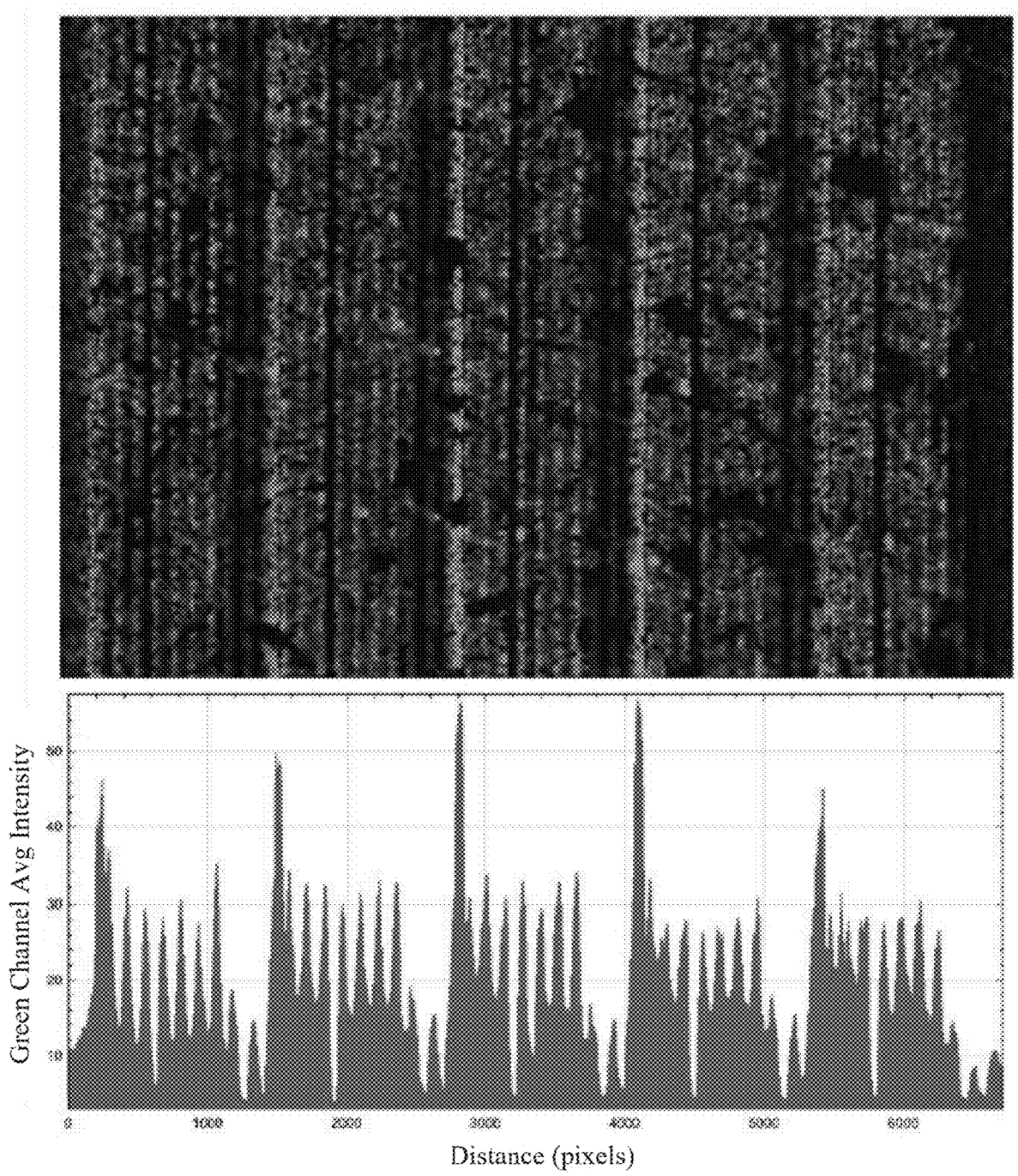

FIGS. 6A-6B illustrate the results of 10-plex permeabilization screen for fresh-frozen human cerebellum tissue. A multiplexed screen of 10 permeabilization agents (5 replicates each) was applied using a 50 µm chip to a Human FF Cerebellum section, revealing that optimal analyte accessibility was achieved at 0.5% Tx-100, closely followed by 0.1% Tx-100. Other reagents, especially pepsin, digested the tissue so strongly that they suppressed fluorescent signal compared to background.

Figure 7:
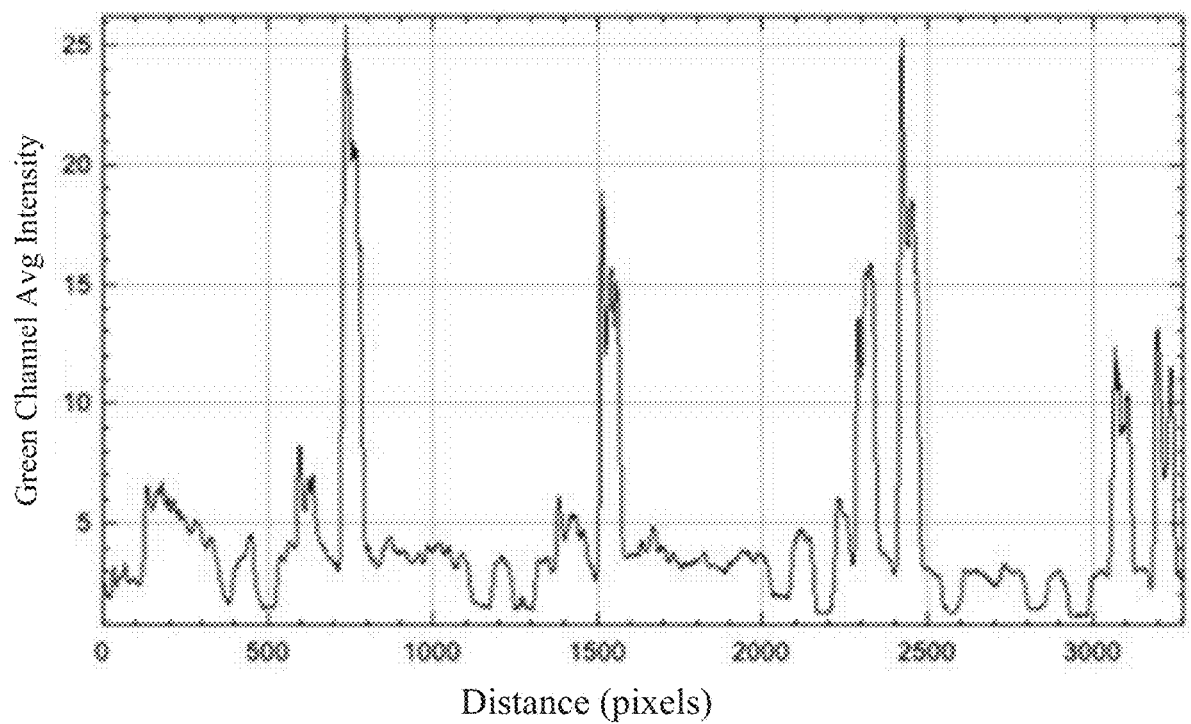
FIG. 7 illustrates differences in probe uptake in adult mouse FF brain tissue under different permeabilization conditions.

FIG. 7 illustrates differences in probe uptake in different tissue types under different permeabilization conditions. 1% Tx-100 optimized probe take up in most of a Mm FF brain sample, but not the cortex. 10-plex permeabilization screening in Mm FF brain revealed that 1% Tx-100 yields highest analyte accessibility in the striatum and fiber tracts. However, probe take-up remained low in the cortex, despite presence of tissue as shown by the DAPI nuclear DNA (deoxyribose nucleic acid) stain (blue). This suggests that analyte accessibility and/or amount varies with tissue type and highlights the importance of marginalizing over location when comparing conditions.

In some embodiments, a 10-plex permeabilization screen in fresh-frozen kidney tissue is conducted. Overall signal was low in the Mm FF kidney, independently of treatment condition. In a 10-plex permeabilization screen in Mm FF kidney, only 2 ug/mL proteinase-k was correlated with probe uptake providing a fluorescent signal higher than background. This is consistent with other Mm FF and Hs FF kidney samples we have tested.

Figure 8:
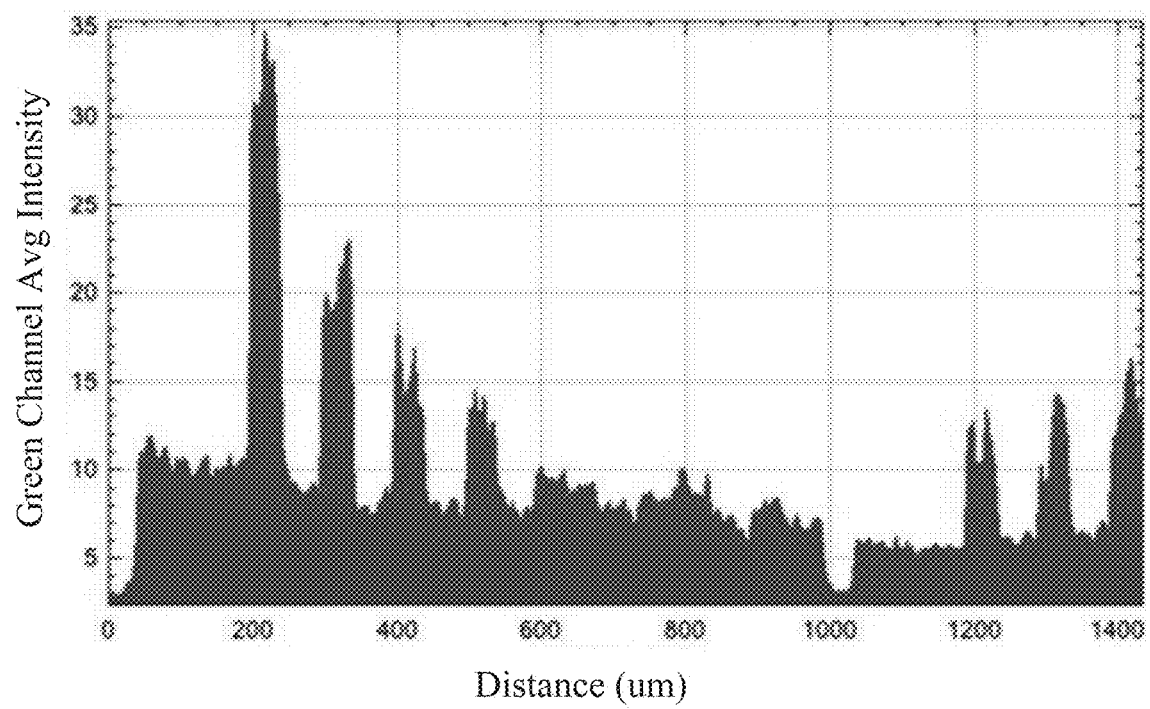
FIG. 8 illustrates the results of a 10-plex permeabilization screen in adult mouse formalin-fixed paraffin-embedded (FFPE) brain tissue.

FIG. 8 illustrates the results of a 10-plex permeabilization screen in formalin-fixed paraffin-embedded (FFPE) brain tissue. The optimal Triton X-100 concentration in Mm FFPE brain is above 2%. Mm FFPE brain tissue was deparaffinized, subjected to heat-induced antigen retrieval, and was treated with a 10-plex permeabilization screen, demonstrating that 2% Triton X-100 enabled the highest probe uptake. Since this was again the highest Triton X-100 concentration we tested, we do not yet know at what concentration the benefits of permeabilizing the cell membrane will be outweighed by excessively digesting or disrupting the tissue/analytes.

FIG. 9 illustrates the results of a 10-plex permeabilization screen in fresh-frozen brain tissue. The predicted optimal Triton X-100 concentration in Hs fresh-frozen brain is 2%. Hs FF brain tissue was subjected to a 10-plex permeabilization screen. The regions receiving 1% and 2% Triton X-100 permeabilization concentration displayed the highest probe uptake, with 2% delivering slightly higher average fluorescent intensity than 1% or 5%.

Figure 10:
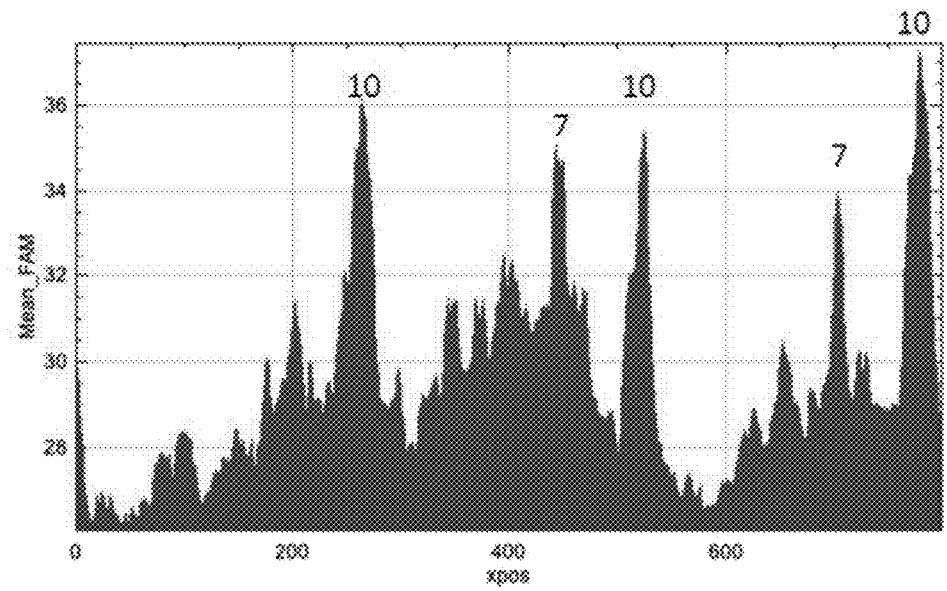
FIG. 10 illustrates the results of a 10-plex permeabilization screen in human ovarian/fallopian tube epithelium tissue.

FIG. 10 illustrates the results of a 10-plex permeabilization screen in ovarian fallopian tube epithelium tissue.

Figure 11:
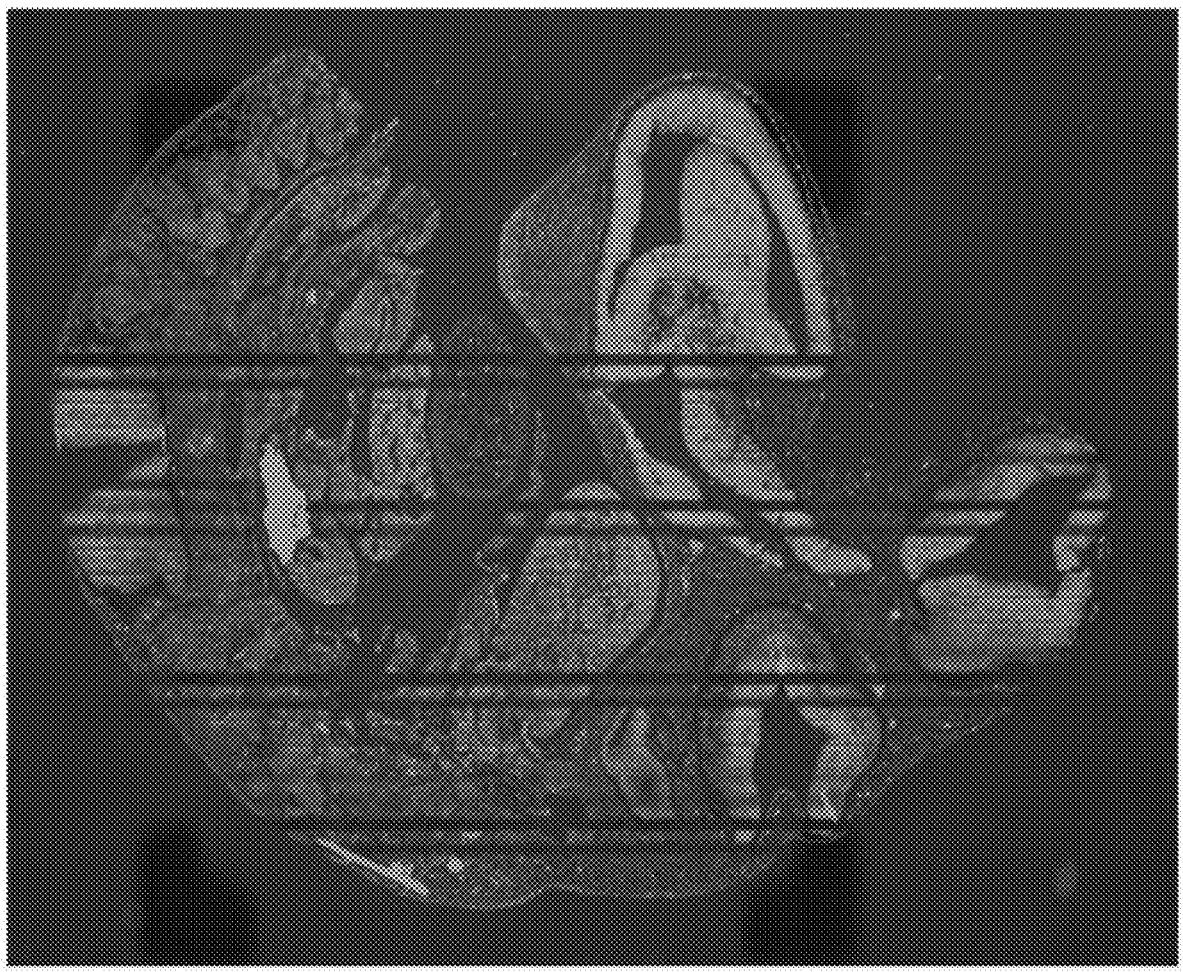
FIG. 11 illustrates region-of-interest variation in permeabilization screening across a single mouse E11 FFPE tissue section.

FIG. 11 illustrates region-of-interest variation in permeabilization screening across a single tissue section. A FFPE Mm E11 de-paraffinized and subjected to heat-induced epitope retrieval, then treated with a multiplexed screen of 10 detergents and enzymes. Demonstrates tissue-dependent relationship between permeabilization condition and stain take-up. Highlights the fact that different regions of interest, even on the same tissue section, may require different permeabilization conditions.

Figure 12:
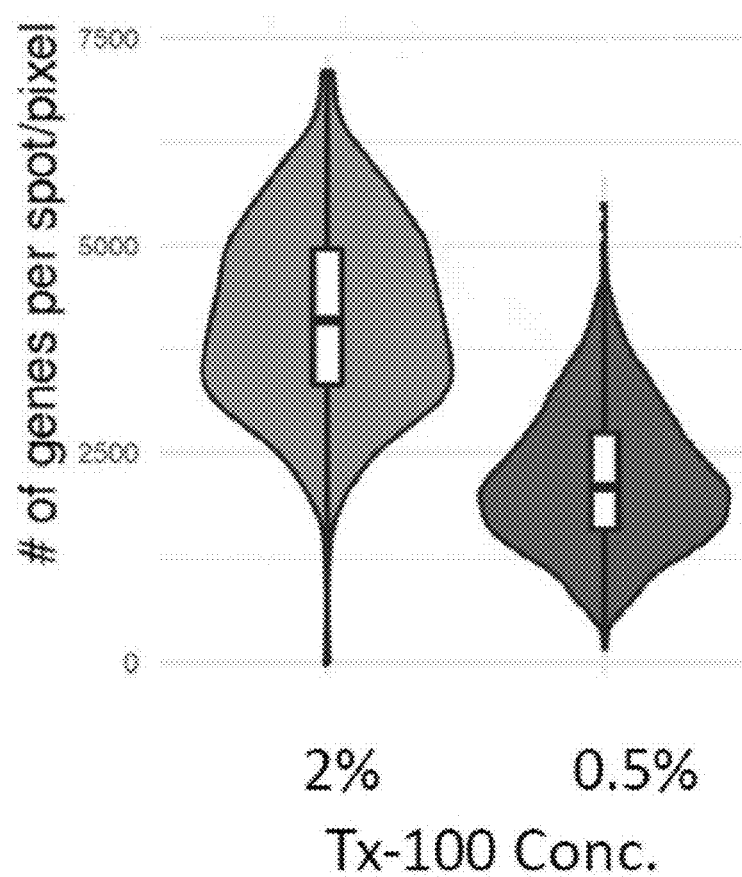
FIG. 12 illustrates the predicted results of DBiT-seq assays at varying permeabilization conditions, based on high throughput screening of tissue preparation conditions.

FIG. 12 illustrates the predicted results of DBIT-seq assays at varying permeabilization conditions, based on high throughput screening of tissue preparation conditions. The systems and methods for high throughput screening of tissue preparation conditions described herein predicts that Hs FF cerebellum tissue has higher analyte accessibility at 2% Tx-100 as compared to our standard 0.5% Tx-100. A comparison of N=3 replicate DBIT-seq runs performed at each permeabilization condition (i.e., three runs at 2%, three runs at 0.5%) on parallel sections from the same tissue sample confirmed higher quality signal, as measured by gene and UMI counts per tixel, in the more aggressive permeabilization condition.

The systems and methods for high throughput screening of tissue preparation conditions described herein can be used to screen a wide variety of parameters, not only permeabilization condition. It can also use readouts besides fluorescence microscopy.

Fixation or post-fixation conditions (formaldehyde, paraformaldehyde, glutaraldehyde, ethanol, methanol . . . )
    Can be before or after permeabilization.
Different staining reagents, enzymes or conditions
    Priming sites or methods
        OligodT of different lengths
        Random hexamer priming *
        Different epitopes
    Polymerization enzymes (e.g., RT, ligation) or reaction conditions (e.g., salt concentrations/stringency)
Signal-to-noise and background suppression optimizations
    Blocking reagent concentrations
        Nonspecific binding (e.g. serum, blocking peptide).
        Endogenous enzyme activity (e.g. peroxidase, alkaline phosphatase)
    Quenchers/quenching dyes (e.g. Sudan Black B)
    Fractionations, selective lysis, or extractions of readout contaminants (e.g. autofluorescent molecules: porphyrins, flavins)
Tissue, fraction, or analyte recovery (e.g., lysis conditions), cell/nuclei dissociation (e.g., nuclear suspensions)
Tissue clearing (e.g. optical, digestion)
Brightfield/light microscopy readout instead of fluorescent (e.g., chemogenic techniques)
NGS readout using spatial barcodes (e.g., DBiT with different conditions in each channel)
Serial treatments and combinatorial treatment arrays
    Flow different reagents successively through the same partition (e.g. $H_2O_2$, followed by detergent)
    Flow set 1 of pretreatment test reagents, followed by set 2 of pretreatment test reagents in partitions (e.g. microfluidic channels) at an orthogonal angle to set 1, creating an array of pretreatment conditions Upon establishing an absolute measurement of reagent uptake, rather than a relative fluorescence brightness, then the systems and methods for high throughput screening of tissue preparation conditions described herein could be used to compare the amount and accessibility of analyte in a tissue sample relative to other tissue samples, and not just between conditions in the same tissue sample.

Fluorescent intensity as measured by a camera is highly variable, and depends on:
    Camera variables (temperature, electrical noise/dark current, exposure times, light collection properties)
    Illuminator variables (intensity, emitted light spectrum)
    Reagent variables (concentration, age)
Despite fluorescent intensity being comparable within runs, and often sequential runs, runs performed in different locations, in different times, different reagent batches, and on different tissue samples may not be universally comparable.

Improving the systems and methods for high throughput screening of tissue preparation conditions described herein by normalizing signal against an absolute unit comparable between tissue samples analyzed in different times and places by different users and platforms would:

Provide an extremely valuable gating QC for performing DBiT

Potentially supplant or supplement standard tissue quality control methods, such as RNA Integrity Number (RIN) and DV-200.

Figure 13:
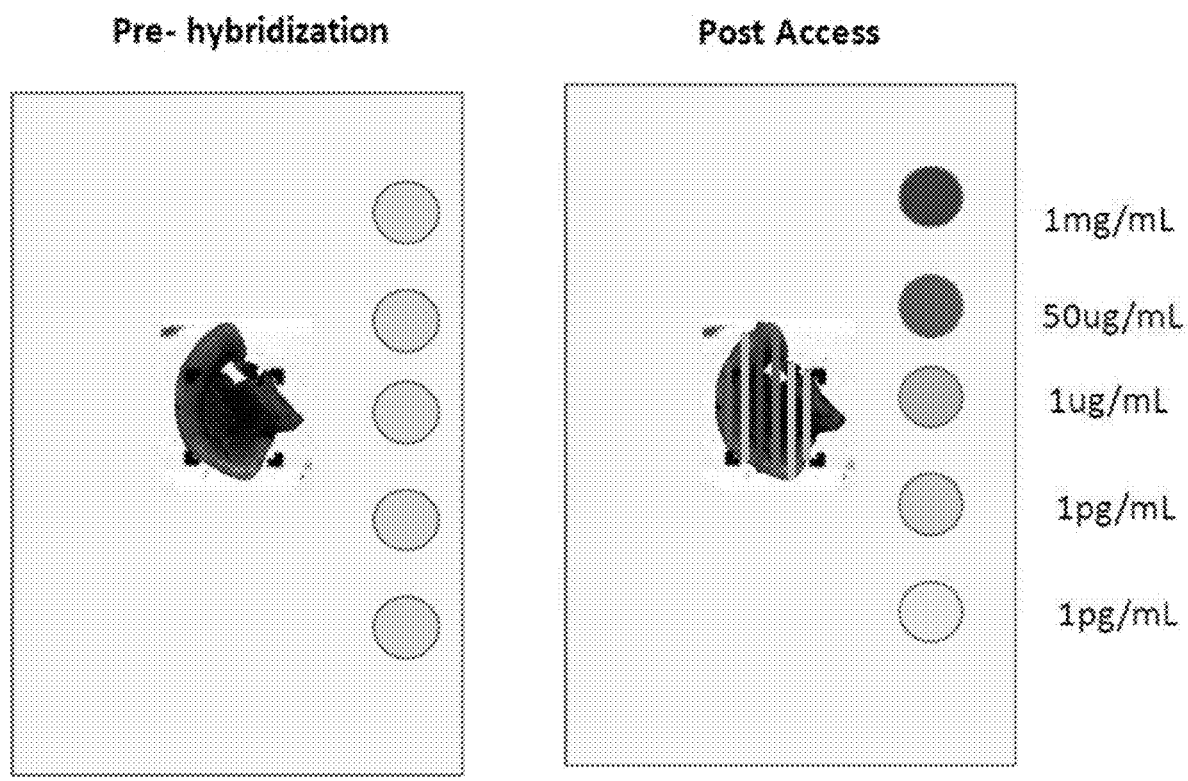
FIG. 13 illustrates embodiments of a custom microarray which in combination with the method described herein enables normalized high throughput screening of tissue preparation conditions and analyte accessibility.

FIG. 13 illustrates embodiments of a microarray slide enabling quantitative high throughput screening of tissue preparation conditions. The circles represent a series of spots bearing immobilized oligo sequence terminated by poly-A, mixed with sequences not terminated by poly-A, mixed in the shown concentrations. The known concentration enables conversion from relative fluorescent signal to a known number of hybridization interactions. Therefore fluorescent signal on the tissue can be matched to its closest matching calibration spot and assigned a calibrated analyte accessibility score, proportional to the number of analytes recovered in that region of the tissue. Since this score is normalized against a known amount of binding interactions, rather than a relative fluorescent signal which varies from sample to sample, this score can then be compared with other high throughput screening of tissue preparation conditions assays performed at different times, with different equipment, and on different tissue samples.

Testing Variations in Concentration of Active Enzymes

Figure 14A:
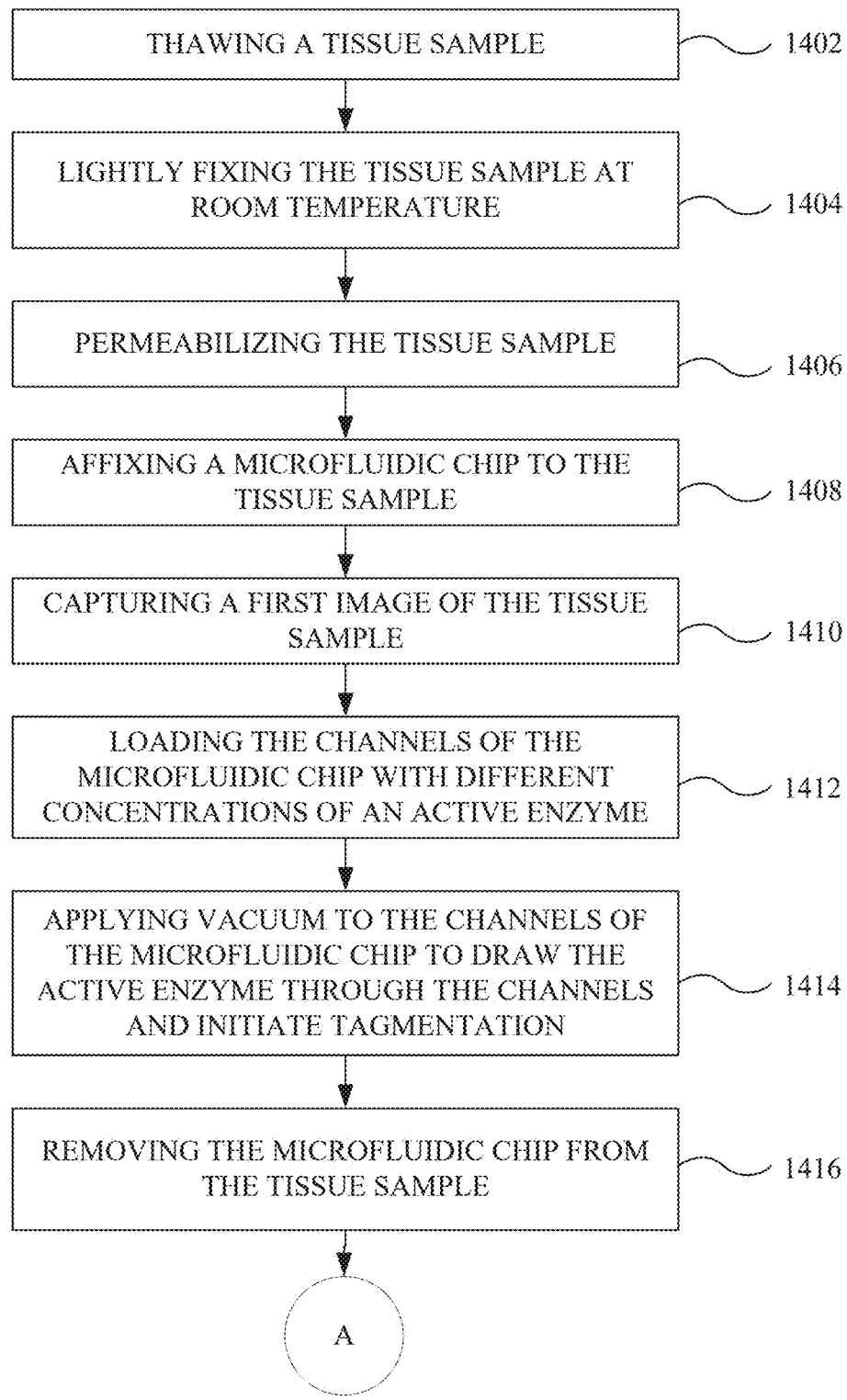
FIGS. 14A-14B show a show a flow chart describing an exemplary process for optimizing a concentration of an active enzyme.
Figure 14B:
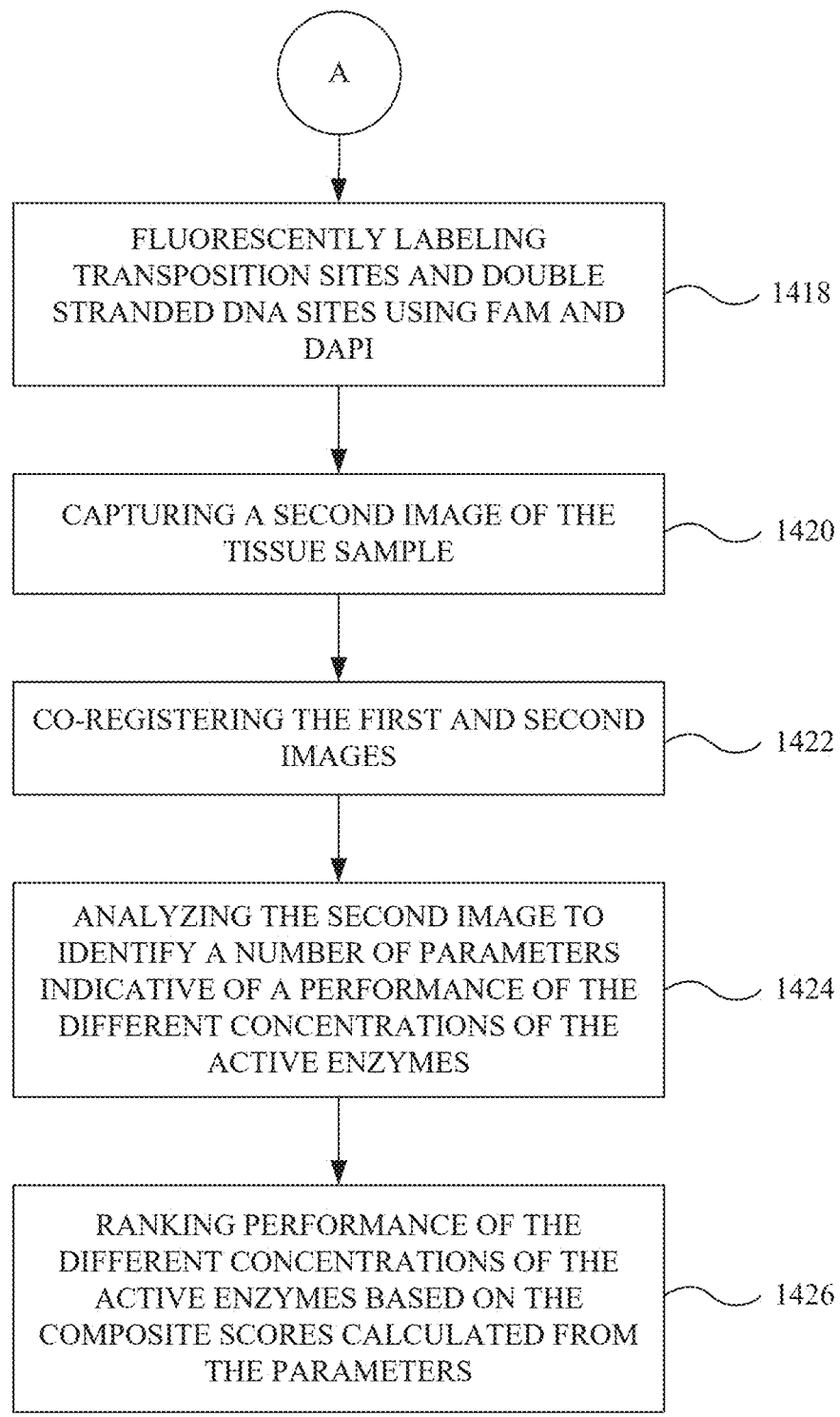

FIGS. 14A-14B show a flow chart describing an exemplary process for optimizing a concentration of an active enzyme. At step 1402, a tissue sample taking the form of a fresh frozen Mus muculus (Mm) embryo section stored at −80C is thawed briefly at room temperature. At step 1404, the tissue sample is lightly fixed in 0.2% paraformaldehyde (PFA) for 20 minutes at room temperature. At step 1406, the tissue sample is permeabilized with a single permeabilization agent. A common permeabilization agent for fresh frozen (Mm) embryo is 0.5% Triton X-100 in phosphate-buffered saline (PBS). In this example, the tissue sample can be permeabilized for 20 minutes at room temperature. At step 1408, a microfluidic chip with 50 channels (each with a 50 micron channel width in the region of interest) is affixed to the tissue sample using a clamp. At step 1410, a first image of the tissue sample is captured. The device used to capture the first image can be a brightfield microscope. The image reveals the position of the 50 microfluidic channels relative to the tissue sample.

At step 1412, the channels of the microfluidic chip are loaded with a reagent taking the form of an active enzyme. A concentration of the active enzyme in a first one of the channels is different than a concentration of the active enzyme in a second one of the channels of the microfluidic chip. For example, in the event five different concentrations of the active enzyme are being tested, channels 1, 6, 11, 16, 21, 26, 31, 36, 41 and 46 are loaded with a first concentration of the active enzyme, channels 2, 7, 12, 17, 22, 27, 32, 37, 42 and 47 are loaded with a second concentration of the active enzyme, channels 3, 8, 13, 18, 23, 28, 33, 38, 43 and 48 are loaded with a third concentration of the active enzyme, channels 4, 9, 14, 19, 24, 29, 34, 39, 44 and 49 are loaded with a fourth concentration of the active enzyme and channels 5, 10, 14, 20, 25, 30, 35, 40, 45 and 50 are loaded with a fifth concentration of the active enzyme. In this way, each enzyme is distributed spatially over the tissue sample to avoid a situation in which the performance of one concentration of the active enzyme is skewed by virtue of the portion of the tissue sample it interacts with. The active enzyme can take many forms but in this exemplary embodiment the active enzyme takes the form of Th5, which is a bacterial enzyme that integrates a DNA fragment into genomic DNA. Other exemplary active enzymes can include reverse transcriptase, T4 Ligase and any number of other click chemistries. It should be noted that while a specific distribution of channels is described above that any distribution could be used. For example, a tissue sample might have inhomogeneity caused by visible openings or voids that overlap particular channels of a microfluidic chip. In this eventuality it may be advantageous to manually adjust the distribution of channels so that each concentration of active enzyme is more equally affected by the visible openings or voids in the tissue sample.

At step 1414, vacuum is applied to the channels of the microfluidic chip to draw a sufficient mixture of active enzyme through the channels of the microfluidic chip to perform tagmentation. In some embodiments, the application of vacuum is performed at −3PSIG for 10 minutes to achieve a state in which the active enzyme can initiate tagmentation on the tissue sample. The active enzyme drawn through the channels is allowed to sit in the channels for a predetermined incubation time. In some embodiments the incubation time is 30 minutes and performed at a temperature of 37 degrees C. (98.6 F). At step 1416, the microfluidic chip is removed/delaminated from the tissue sample and the tissue sample is quenched with 40 mM Ethylenediaminetetraacetic acid (EDTA) to stop tagmentation resulting from interaction of the tissue sample with the various active enzyme solution concentrations.

At step 1418, the tissue sample is washed in water and/or a buffered solution such as phosphate-buffered saline. Transposition sites of the tissue sample are then fluorescently labeled with a linker oligo conjugated with a fluorescent molecule such as FAM (a single isomer derivate of fluorescein). This has the effect of coloring the transposition sites with a first color. In the present embodiment, the transposition sites are colored green. The tissue sample can also be stained with DAPI, a fluorescent DNA stain, which has the effect of revealing the locations of double-stranded DNA (dsDNA) in a second color different from the first color. DAPI in particular stains the dsDNA locations in blue. The locations of the transposition sites help predict the performance of the various active enzyme concentrations since, in a full assay, the transposition sites serve as the boundaries of the genomic DNA fragments to be captured (e.g. spatially barcoded and amplified, or simply amplified and then sequenced). Observing the location of these sites relative to the site of deposition of capture barcodes serves as a good predictor of the likelihood that the capture barcode would, in a full assay, successfully capture target analytes such as genomic DNA fragments generated by transposition.

At step 1420, a second image of the tissue sample is captured. In some embodiments, the second image is captured using an epifluorescence scanning microscope. The second image can be assembled from multiple tiled images captured using the blue and green channels of the epifluorescence scanning microscope. It should be noted that low-power stereoscopic inspection scopes, as well as monocular and binocular optical lab microscopes using reflected (rather than transmitted) illumination can be used to view progression of the liquid inside the microfluidic chip as an alternative to the epifluorescence scanning microscope. A cell phone camera with an aligned mount can also be used to view the progress, which makes the process accessible even to those labs without high-powered microscopy resources. At step 1422, the first and second images are co-registered, which allows for the separation of the second image into at least 50 regions or one region for each channel of the microfluidic chip. The regions sharing the same active enzyme concentrations are grouped together to form in this embodiment 5 different groups, where each group contains imagery from 10 of the 50 regions.

Co-registering the first and second images can be performed in a number of different ways. One method for co-registering the first and second images is to look for the impressions left by the flow step in the tissue. The PDMS channel walls of the microfluidic chip imprint depressed areas in the tissue, revealing where the chip had been clamped before removal. However, large areas free of tissue may make it difficult or impossible to use the impressions left to locate the chip. In such cases, during the flow a BSA-fluorophore conjugate can be included in the outer lanes (e.g., lanes 1 and 50 in a 50-channel chip). The BSA will bind non-specifically to both poly-L-lysine coated glass and tissue, thereby revealing the location of lanes 1 and 50, thereby easing the co-registration process. Care should be taken that the BSA-fluorophore conjugate does not interfere with the assay being conducted. For example, a primary antibody in an IF or IHC protocol should out-compete the BSA for its target epitopes. If the BSA-conjugate is likely to interfere, those lanes can be sacrificed and left devoid of actual reagent and only flow BSA conjugate.

In the event co-registration is being performed in multiple dimensions (see FIGS. 16A-16C), it will aid image co-registration to include two colors of BSA-fluorophore conjugate. For example, using a green-emission fluorophore in lane 1 and a red-emission fluorophore in lane 50 of both the first and second microfluidic chips to help preserves the orientation of the chips for downstream analysis. Specifically, in the case of two 50-channel microfluidic chips, it is necessary to know during image analysis where the intersection points of the first row and column and of the last row and column are to orient the location of the tissue preparation conditions.

At step 1424, the regions of the second image can be analyzed to determine a number of parameters. In particular, a median brightness above a threshold level (I), the Pearson correlation between DAPI and FAM (P) and the first Manders coefficient (M1) of FAM into DAPI (roughly, the probability that a FAM pixel is located on a DAPI pixel and not a below-threshold pixel). Various algebraic combinations of the parameters P, M1, and I can be experimented with. One such combination (yielded by multiplying each factor together, P×M1×I) yields a useful composite score C which correlates with downstream spatial-ATAC-seq quality on a like-for-like basis. That is, a high composite score generated on a tissue section using certain workflow parameters for Tn5 and permeabilization accurately predicts that spatial-ATAC-seq assays carried out with the same workflow parameters in a tissue section recovered from the same tissue block (and subjected to as-similar-as-possible handling) will generate high-quality sequencing data. Conversely, a low composite score accurately predicts that spatial-ATAC-seq assays carried out with the same workflow parameters in a tissue section recovered from the same tissue block (and subjected to as-similar-as-possible handling) will generate low-quality sequencing data. The empirical correlation between composite score C and downstream assay success enables multiplexed, high-throughput screening of assay parameters, since each region (or the multiple regions) of the tissue receiving a given treatment condition (Tn5 or permeabilization condition) can be evaluated for suitability by a procedure identical to the one given here, except only in that region (or multiple regions) of the tissue receiving each concentration of the active enzyme.

At step 1426, the parameters derived by analyzing each of the five groups of sub-regions associated with a particular concentration of active enzyme are combined to generate a composite score C for each of the active enzyme concentrations. This calculation is performed for each active enzyme concentration so in the present example, this would yield five composite scores. The composite scores are then used to rank the combination of active enzymes and tissue in order of their likelihood to generate the highest quality spatial-ATAC-seq data. In this way, this set of steps can be used to determine a concentration of active enzyme most likely to work with the tissue samples or tissue samples similar to the tested tissue sample.

Figure 14C:
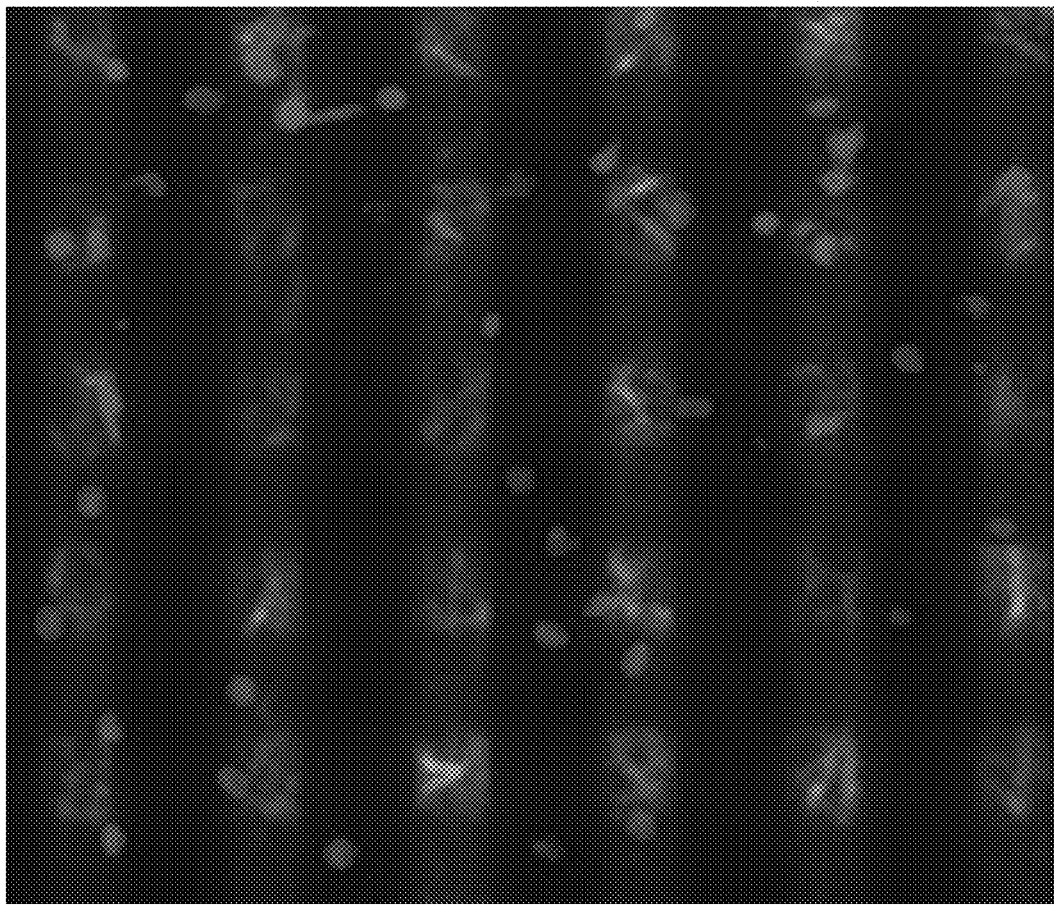
FIG. 14C shows an exemplary image showing stained transposition sites and double stranded DNA locations.

FIG. 14C shows an exemplary image similar to the one in FIG. 4 but a closer up view showing how the double stranded DNA optically marked in blue is located both inside and outside of the portion of the tissue sample acted on by the active enzyme from the channels of the microfluidic chip, while the transposition sites optically marked in green are limited to the areas of the tissue sample acted on by the active enzyme from the channels of the microfluidic chip. While the examples described herein pertain primarily to the use of dyes requiring the use of fluorescent microscopy, the described embodiments could also use dyes compatible with a brightfield imaging device. For example, chromogenic dye visible to brightfield microscopy could be used. Chromogenic dyes usable in this context include at least horseradish peroxidase and haemotoxylin & eosin (H&E) staining. The chromogenic dyes would generally be applied sequentially to the tissue sample, requiring separate incubation periods.

Testing Variations in Incubation Time for Active Enzymes

In addition to testing differences in the composition of the active enzyme a similar procedure can be used to test variations in incubation time. In the event of a need to test two different incubation times, the method described in FIG. 14 can be adjusted by only applying vacuum to a first subset of the channels of the microfluidic chip so that only the portions of the tissue sample contacting the first subset of the channels of the microfluidic chip begin incubation initially. After a predetermined amount of time has passed, vacuum can be applied to another subset of channels of the microfluidic chip. To cover two incubation times, one would generally have half of the channels in the first subset and half of the channels in the second subset. However, the channels could be further divided into smaller subsets in the event it was desirable to test three or four different incubation times at once. Generally, one would reduce the number of different active enzyme concentrations or use uniform enzyme concentrations when testing larger numbers of different incubation times.

Single-Color IF Workflow Optimization

In some embodiments, the method described in conjunction with FIGS. 14A-14B can be modified to find an ideal glial fibrillary acidic protein (GRAP) to stain an FF Mm adult brain section using a single-color immunofluorescence workflow. The method described in FIG. 14 would be modified in the following ways: (1) the concentration of PFA would be increased in step 1404; (2) the permeabilization agent used in step 1406 would be modified to include 10% horse serum and 0.5% Triton X-100 in PBS; (3) the different concentrations of active enzyme would be replaced by different concentrations of a primary antibody, e.g., 2%, 1%, 0.5%, 0.25% and 0.125% in PBS, which is configured to attach to the glial fibrillary acidic protein; (4) treating the whole tissue sample with a secondary antibody, commonly at 1:10000 dilution for 1 hour at room temperature after incubating the tissue sample with the primary antibody and removing the microfluidic chip; (5) co-registering the first image with only the images collected from the green channel of the epifluorescence scanning microscope; and (6) ranking the groups of sub-regions based on average brightness over a threshold value.

A similar strategy could be employed to rapidly optimize other workflow parameters for single-color immunofluorescence by multiplexing the appropriate workflow step. For example, permeabilization agent, concentration and/or time, as well as secondary antibody concentration.

Figure 15A:
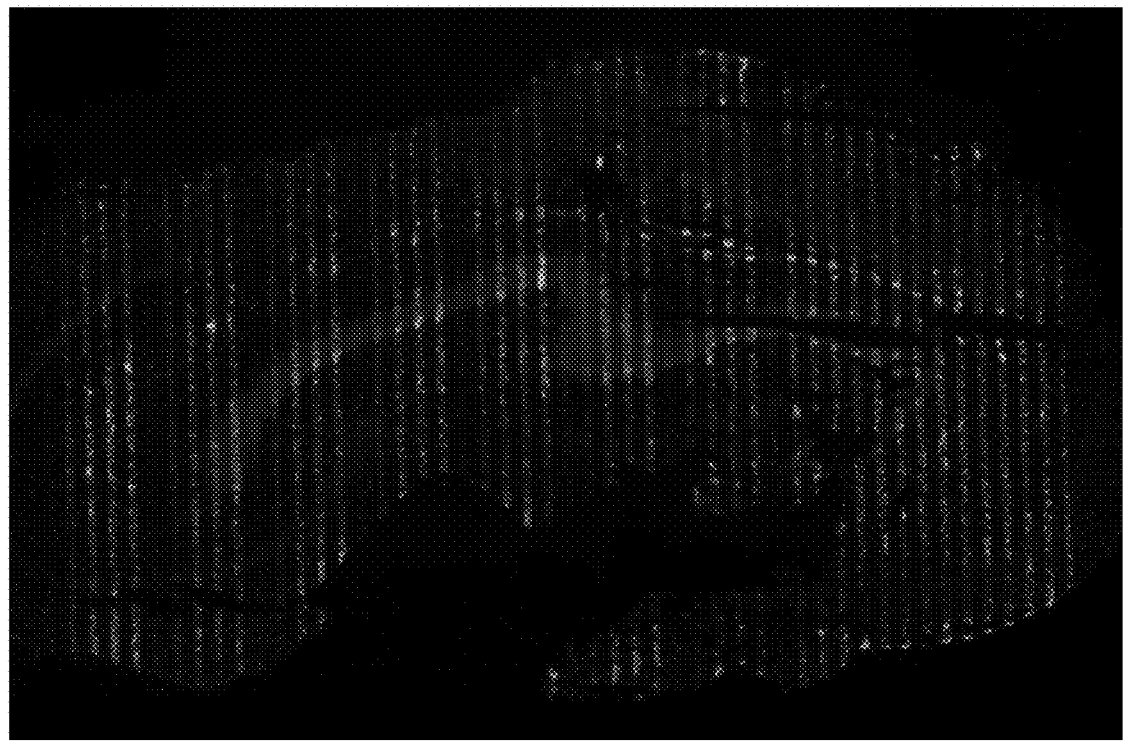
FIGS. 15A-15D show results from an assay employing two sets of antibodies.

FIGS. 15A-15D show results from an assay employing two sets of antibodies as described above. FIG. 15A shows an entire tissue sample where the first and second antibodies were applied using a 50 channel microfluidic chip. The green regions illustrated in FIG. 15A indicate locations of the GRAP within the tissue sample. The green color is emitted by the second antibody, in this embodiment, an Invitrogen donkey anti-rabbit IgG, which emits green fluorescent light and bonds to the first antibody. In the displayed embodiment, the first antibody is a Cell Signaling Technologies rabbit anti-GFAP, which bonds to both the glial fibrillary acidic protein within the tissue sample and the second antibody. While specific antibodies are recited herein, any antibody that is not otherwise incompatible with the material forming the microfluidic chip (e.g., PDMS) should work. The dilution of the primary antibody are 1:1000, 1:200, 1:100 mixed with 10% horse serum in PBS. The blue color is emitted by DAPI, which again is used to highlight the locations of double-stranded DNA.

Figure 15B:
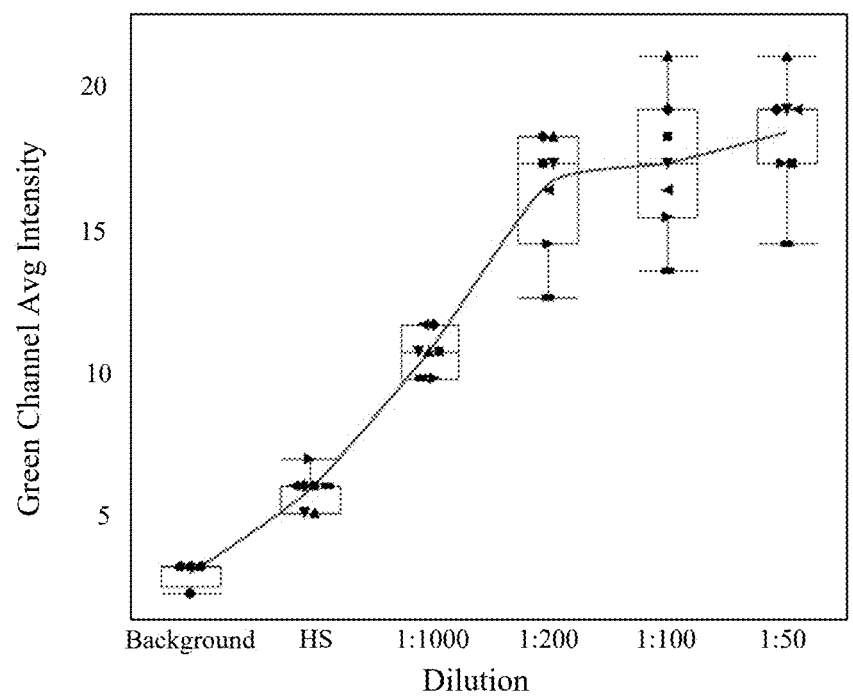

FIG. 15B shows the average intensity or brightness of the green color as a function of dilution of the primary antibody. The chart shows that increasing the dilution of the primary antibody above 1:200 dilution has diminishing effects as illustrated by the flattening of the curve above dilutions of 1:200.

Figure 15C:
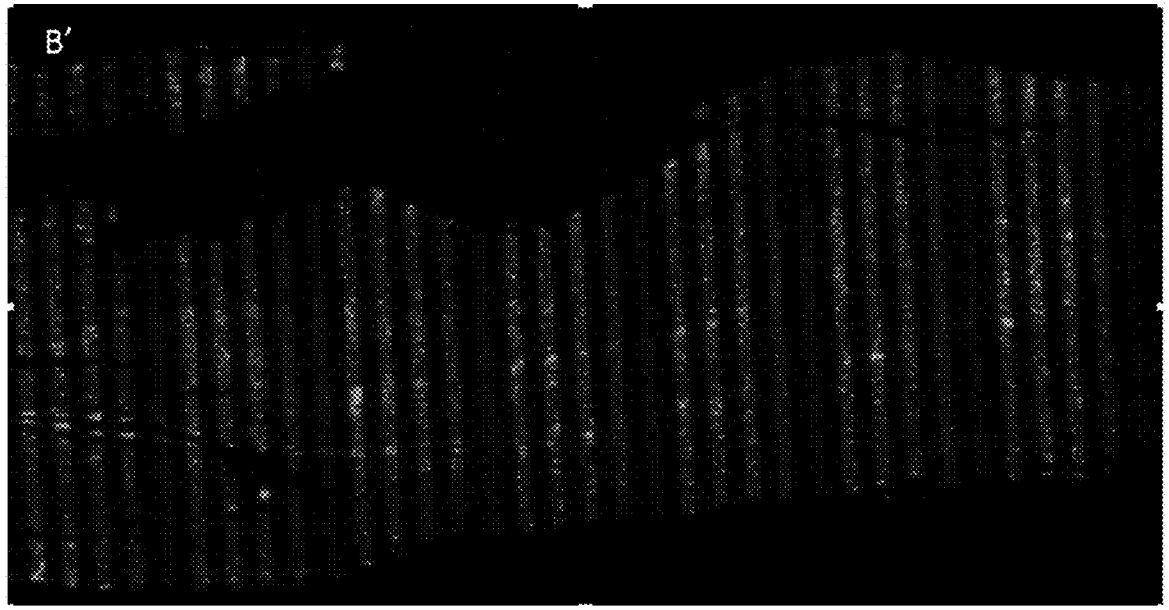
Figure 15D:
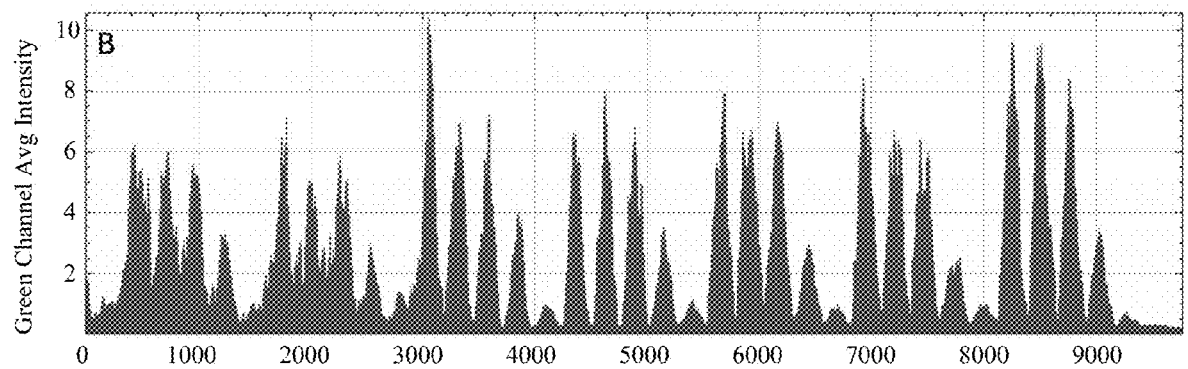

FIG. 15C shows a close up view of the tissue sample shown in FIG. 15A but shows only the green channel and includes about 35 of the 50 channels. FIG. 15D shows a graph that illustrates the average intensity/brightness of the image for each of the 35 channels. These intensity/brightness values are used to generate the graph shown in FIG. 15B, which indicates a 1:200 dilution is probably best for use with this type of assay on tissue samples similar to this tissue sample.

Single-Color IF Workflow Optimization with Two-Dimensional Multiplexing

FIGS. 16A-16C show how in some embodiments, the single-color immunofluorescent workflow optimization described above can be further modified to allow for two-dimensional multiplexing. In particular, FIG. 16A shows a perspective view of an exemplary microfluidic chip 1602 being used to apply five different concentrations of the first antibody to a tissue sample positioned between microfluidic chip 1602 and substrate 1604, where $x_1$-$x_5$ illustrate the different concentrations of the first antibody. While most microfluidic chips would have a larger number of channels, for ease of illustration and explanation microfluidic chip 1602 only includes five channels.

FIG. 16B shows how instead of applying the secondary antibody to the whole tissue sample, different concentrations of the second antibody can be applied to the tissue sample, using a microfluidic chip 1606 or alternatively by reusing microfluidic chip 1602. Microfluidic chip 1606 is oriented such that its channels are oriented orthogonally with respect to the orientation of microfluidic chip 1602 as applied in FIG. 16A. Concentrations of the secondary antibody could include, e.g., 1:200, 1:400, 1:800, 1:1000 and 1:2000. In embodiment where each microfluidic chip includes 50 channels, this results in the antibodies deposited on the tissue sample forming 2500 intersections of the first and second antibodies that can be referred to as "tixels". This results in 25 different combinations of antibody concentrations distributed across the tissue sample. A location of the channels of the microfluidic chip used to apply the second antibody concentrations can be identified by capturing another image showing the location of the channels of the microfluidic chip with respect to the tissue sample using the brightfield microscope.

FIG. 16C shows a top down view of tissue sample 1608 positioned on substrate 1604. The dashed rectangular boxes illustrate the location of the various channels of microfluidic chips 1602 and 1606 take on tissue sample 1608 and how the combination of five different concentrations of the first and second antibodies results in 25 tixels where each tixel contains a unique combinations of antibodies on tissue sample 1608. One reason for using a microfluidic chip with a larger number of channels, e.g. 25 or 50 channels, is that it allows for a more even distribution of various concentrations to be distributed across different regions of tissue sample 1608. As shown in FIG. 16C some of the tixels located on the periphery of tissue sample 1608, such as the ones with combination $x_5y_4$, $x_1y_5$ and $x_1y_5$ in particular may not cover sufficient amounts of tissue sample to provide relevant data points. Furthermore, central regions of a tissue sample may also have higher quality tissue.

Testing Variations in Concentration of Permeabilization Agents

Figure 17A:
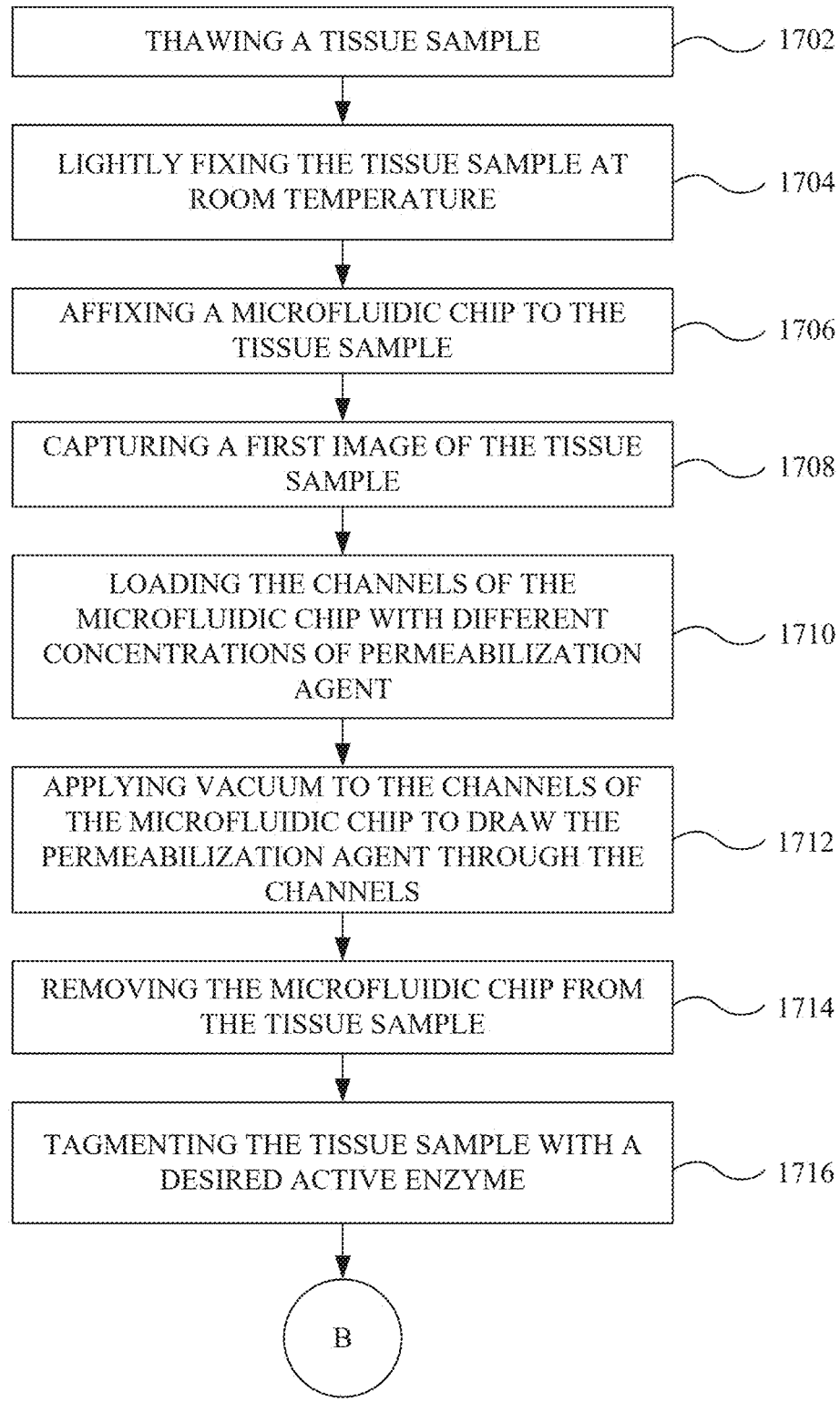
FIGS. 17A-17B show a flow chart describing an exemplary process for optimizing a concentration of a permeabilization agent.
Figure 17B:
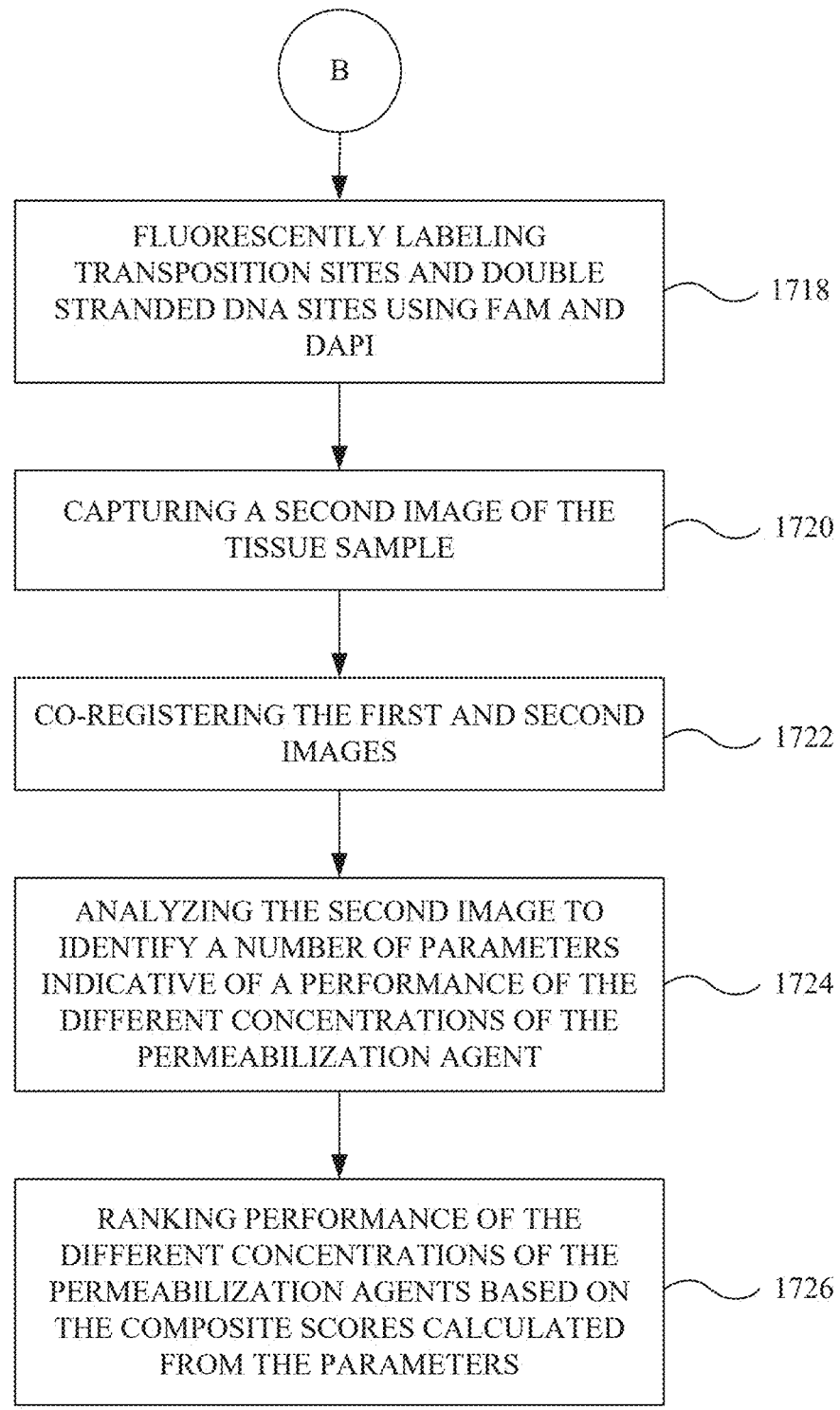

FIGS. 17A-17B show a flow chart describing an exemplary process for optimizing a concentration of a permeabilization agent. At step 1702, a tissue sample taking the form of a fresh frozen *Mus musculus* (Mm) embryo section stored at −80C is thawed briefly at room temperature. At step 1704, the tissue sample is lightly fixed in 0.2% paraformaldehyde (PFA) for 20 minutes at room temperature.

At 1706, a microfluidic chip with 50 channels (each with a 50 micron channel width in the region of interest) is affixed to the tissue sample using a clamp. At step 1708, a first image of the tissue sample is captured. The device used to capture the first image can be a brightfield microscope. The image can be constructed by tiling multiple images captured by the brightfield microscope together to reveal the position of the 50 microfluidic channels relative to the whole tissue sample.

At step 1710, the channels of the microfluidic chip are loaded with a reagent taking the form of a permeabilization agent. A concentration of the permeabilization agent in a first one of the channels is different than a concentration of the permeabilization agent in a second one of the channels of the microfluidic chip. For example, in the event five different concentrations of the active enzyme are being tested, channels 1, 6, 11, 16, 21, 26, 31, 36, 41 and 46 are loaded with a first concentration of the permeabilization agent, channels 2, 7, 12, 17, 22, 27, 32, 37, 42 and 47 are loaded with a second concentration of the permeabilization agent, channels 3, 8, 13, 18, 23, 28, 33, 38, 43 and 48 are loaded with a third concentration of the permeabilization agent, channels 4, 9, 14, 19, 24, 29, 34, 39, 44 and 49 are loaded with a fourth concentration of the permeabilization agent and channels 5, 10, 14, 20, 25, 30, 35, 40, 45 and 50 are loaded with a fifth concentration of the permeabilization agent. In this way, each concentration of the permeabilization agent is distributed spatially over the tissue sample to avoid a situation in which the performance of one concentration of the permeabilization agent is skewed by virtue of the portion of the tissue sample it interacts with. The permeabilization agent can take many forms but in this exemplary embodiment the permeabilization agent takes the form of Triton X-100 in phosphate-buffered saline (PBS), It should be noted that while a specific distribution of channels is described above that any desired distribution could be used. For example, a tissue sample might have inhomogeneity caused by visible openings or voids that overlap particular channels of a microfluidic chip. In this eventuality it may be advantageous to manually adjust the distribution of channels so that each concentration of active enzyme is more equally effected by the visible openings or voids in the tissue sample.

At step 1712, vacuum is applied to the channels of the microfluidic chip to draw a sufficient mixture of permeabilization agent through the channels of the microfluidic chip to perform permeabilization of the tissue sample. In some embodiments, the application of vacuum is performed at −3PSIG for 10 minutes to achieve a state in which the permeabilization agent can permeabilize the tissue sample. The permeabilization agent drawn through the channels is allowed to sit in the channels for a predetermined incubation time. In some embodiments the incubation time is 20 minutes and performed at room temperature. At step 1714, the microfluidic chip is removed/delaminated from the tissue sample and the tissue sample is washed in water or a buffered solution such as Phosphate-Buffered Saline (PBS).

At step 1716, the entire tissue sample is then tagmented with a desired active enzyme, such as Tn5, for 30 minutes at 37 degrees C. followed by quenching with EDTA and washing in a buffered solution such as PBS.

At step 1718, transposition sites of the tissue sample are fluorescently labeled with a linker oligo conjugated with a fluorescent molecule such as FAM (a single isomer derivate of fluorescein). This has the effect of coloring the transposition sites with a first color. In the present embodiment, the transposition sites are colored green. The tissue sample can also be stained with DAPI, a fluorescent DNA stain, which has the effect of revealing the locations of double-stranded DNA (dsDNA) in a second color different from the first color. DAPI in particular stains the dsDNA locations in blue.

At step 1720, a second image of the tissue sample is captured. In some embodiments, the second image is captured using an epifluorescence scanning microscope. The second image can be assembled from multiple tiled images captured using the blue and green channels of the epifluorescence scanning microscope. Different color channels of the epifluorescence scanning microscope could be used in the event the tissue sample is stained with different colors. It should be noted that different imaging systems can be used to capture the second image as is described in step 1418, above. At step 1722, the first and second images are co-registered, which allows for the separation of the second image into at least 50 sub-regions or one sub-region for each channel of the microfluidic chip. The sub-regions sharing the same active enzyme concentrations are grouped together to form in this embodiment 5 different groups, where each group contains imagery from 10 of the 50 sub-regions.

At step 1724, the sub-regions of the second image can be analyzed to determine a number of parameters. In particular, a median brightness above a threshold level (I), the Pearson correlation between DAPI and FAM (P) and the first Manders coefficient (M1) of FAM into DAPI (roughly, the probability that a FAM pixel is located on a DAPI pixel and not a below-threshold pixel). As described in step 1422 above, various algebraic combinations of the parameters P, M1, and I can be experimented with to generate a useful composite score.

At step 1726, the parameters derived by analyzing each of the five groups of sub-regions associated with a particular concentration of permeabilization agent are combined to generate a composite score C for each of the permeabilization agent concentrations. This calculation is performed for each active enzyme concentration so in the present example, this would yield five composite scores. The composite scores are then used to rank the combination of permeabilization agent and tissue in order of their likelihood to generate the highest quality spatial-ATAC-seq data. In this way, this set of steps can be used to determine a concentration of active enzyme most likely to work with the tissue samples or tissue samples similar to the tested tissue sample.

It should be noted that the above procedure could also be used to screen multiple permeabilization incubation times as described above with the incubation time variation for the active enzymes.

Partial NGS Readout Configuration

In some embodiments, a hybrid assay can be performed with a Next-Generation (NGS)-based readout in lieu of fluorescent microscopy readout can be used. In particular, an NGS readout assay differs following step 1414 from FIG. 14A. An NGS readout assay differs following step 1716 of the method described in FIG. 17A and also differs since instead of removing the microfluidic chip in step 1514, the active enzyme is applied using the microfluidic chip. This method is also advantageous as it doesn't require taking any images of the microfluidic chip or tissue sample.

Following tagmentation, the tissue sample is quenched and/or washed using the microfluidics chip and then the microfluidics chip is used to perform barcoding. Each of the channels of the microfluidic device receives a different A-type barcode. After flowing the A-type barcodes through the microfluidic chip, a same B-type barcode is flowed through each of the channels of the microfluidic chip. The tissue sample is then allowed to incubate to affect ligation on the tissue sample. After ligation is complete, the procedure continues with a standard spatial-ATAC-seq procedure. The resulting NGS data will consist of 50 long rectangles formed by the intersection of the A microfluidic chip with the lysis chip. Analytes recovered in each of these 50 areas will exhibit a spatial differential signal owing to the different treatment received by each of the 50 areas. In a grouping-and-averaging process similar to those detailed in the descriptions of FIGS. 14A-14B and 17A-17B, the NGS readout can be averaged for each treatment group and performance between groups compared to rank the multiplexed conditions by performance.

Relevant NGS performance parameters or variables to compare between groups are numerous, and could include the number of fragments recovered, the Transcription Start Site enhancement (TSS enhancement) score, the fragments of reads in peaks (FRIP), the percentage of non-nuclear reads, the percentage of mitochondrial reads, or one of a number of other quantitative metrics well known to those skilled in the art of NGS-based chromatin accessibility data analysis. When carrying out this type of assay, channels with identical treatment conditions should be separated geographically so as to marginalize over tissue heterogeneity.

Optimizing Permeabilization for Multiple Color Assays

The described embodiments can also economically discover suitable workflow parameters for multi-color assays, with each color pertaining to a separate biological analyte (including but not limited to peptide, protein, mRNA species, genomic DNA sequences, nuclear protein or protein modifications such as histone marks, or other analytes of interest). Here we present an example of optimizing a workflow for a multi-color fluorescence in situ hybridization (FISH)-based assay.

Suppose we wish to stain an FFPE Mm adult brain section against three messenger RNA (mRNA) species. Four such probes can be acquired from RNAScope, a commercial product marketed by ACD. RNAScope offer both off-the-shelf and custom probes. In this case we will (b) optimize permeabilization and (b) optimize concentrations for three off-the-shelf probes.

Multiplexing protease concentration in a microfluidics chip enables economical optimization of an assay method in a tissue-sample specific manner. The following steps are adapted from an RNAScope commercial protocol.

A formalin-fixed, paraffin-embedded (FFPE) Mm brain section tissue sample stored at −80C is thawed briefly at room temperature (RT). The tissue sample is then baked at 60° C. for one hour. The tissue sample is then de-paraffinized in Xylene for 5 minutes, then washed in 100% ethanol for 5 minutes, twice. The tissue is re-hydrated in 90% and then 70% ethanol. The tissue is submerged in 95C sodium citrate buffer for 15 minutes, then rinsed with deionized water. A microfluidic chip with 50 channels, each with 50 μm channel width in the region of interest, is affixed to the tissue section with a suitable clamp. A whole-section image is acquired with a brightfield microscope revealing the positions of the 50 microfluidic channels on the tissue sample.

Each channel's inlet is loaded with one of five different concentrations of a permeabilization agent (P1, P2, P3, P4, P5). In this example the permeabilization agent takes the form of protease and the different concentrations can be 0.5, 1, 5, 10, and 20 micrograms per milliliter concentration. Channels 1, 6, 11, 16, 21, 26, 31, 36, 41 and 46 receive P1. 2, 7, 12, 17, 22, 27, 32, 37, 42 and 47 receive P2. Channels 3, 8, 13, 18, 23, 28, 33, 38, 43 and 48 receive P3. Channels 4, 9, 14, 19, 24, 29, 34, 39, 44 and 49 receive P4 and channels 5, 10, 15, 20, 25, 30, 35, 40, 45 and 50 receive P5. Next, all channels are acted on with vacuum such that all 50 channels receive sufficient permeabilization reagent. A typical vacuum condition is −3 PSIG for 10 minutes. The entire assembly is then incubated at room temperature for 20 minutes.

After incubation, the microfluidic chip is removed or delaminated from the section, and the section is washed in water or a buffered solution such as Phosphate-Buffered Saline (PBS). The remainder of the RNAScope assay is carried out. All three probes are delivered to the entire tissue section simultaneously. The four hybridization steps (Hybridize Amp-1, Amp-2, Amp-3, and Amp-4) are carried out. The section is counter-stained with DAPI. An epifluorescence scanning microscope acquires tiled images of the entire section in four separate channels (one for each probe, and the last for DAPI). The image with the channels is co-registered with the multicolor image just acquired. This enables analytical separation of the section into 50 sub-regions. The sub-regions with the same protease concentration are grouped. That is, all the regions that received the P1 treatment are grouped with each other, and so on. Each of the 5 groups now corresponds to 10 regions of tissue that each received the same treatment. The brightness above threshold for the fluorescence signal is computed separately for each of the 5 groups and separately for each of the color channels. A variety of algebraic equations may be applied to evaluate the 20 scores thus obtained (5 brightness scores for each of the four color channels). In some embodiments, one color channel may be weighed more heavily when computing a composite score. This may be the case when one of the color channels corresponds to a housekeeping gene rather than to a gene of true biological interest.

It should be noted that while the described embodiments focused mainly on varying characteristics of reagents that included variations in concentrations and incubation times, the characteristics of the reagents and the types of reagents can vary widely. For example, pretreatment conditions such as citrate buffer temperature, pH, incubation time and protease concentrations could all be varied as part of the described embodiments. Furthermore, different types and/or concentrations of permeabilization agents or active enzymes could also be run through a microfluidic chip at once. In some embodiments, the assays could be implemented using a computer controlled mechanisms having processors running computer code that when executed is capable of using the computer controlled mechanism to manipulate the tissue sample, the microfluidic chip and draw the various reagents over the tissue sample through the microfluidic chip.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method, comprising:
affixing a microfluidic chip having a plurality of channels to a tissue sample such that a first channel of the plurality of channels traverses at least a first region of the tissue sample and a second channel of the plurality of channels traverses at least a second region of the tissue sample;
capturing a first image of the microfluidic chip affixed to the tissue sample that shows a position of at least the first channel and the second channel of the plurality of channels relative to the tissue sample;
flowing a plurality of reagents through the plurality of channels of the microfluidic chip, wherein flowing the plurality of reagents through the plurality of channels comprises:
flowing a first reagent through the first channel, wherein the first reagent interacts with the first region of the tissue sample; and
flowing a second reagent through the second channel, wherein the second reagent interacts with the second region of the tissue sample, wherein the first reagent differs from the second reagent and/or a first characteristic of the interaction between the first reagent and the first region differs from a second characteristic of the interaction between the second reagent and the second region;
removing the microfluidic chip from the tissue sample;

optically marking the tissue sample to identify a quality of the tissue sample and areas in the tissue sample affected by the flow of the plurality of reagents over the tissue sample;
capturing a second image of the tissue sample after removing the microfluidic chip;
co-registering the first and second images resulting in a separation of the second image into a plurality of image regions, wherein a first image region of the plurality of image regions is a first portion of the second image that includes the first region of the tissue sample and a second image region of the plurality of image regions is a second portion of the second image that includes the second region of the tissue sample; and
ranking a performance of the plurality of reagents with the tissue sample based on at least an average brightness of the optical markings captured in one or more image regions of the second image that correspond to a respective reagent of the plurality of reagents.

2. The method of claim 1, wherein the first reagent is a first concentration of a permeabilization agent and the second reagent is a second concentration of the permeabilization agent that is different than the first concentration.

3. The method of claim 1, wherein the first reagent is a first concentration of an active enzyme and the second reagent is a second concentration of the active enzyme that is different than the first concentration.

4. The method of claim 1, wherein the first characteristic differs from the second characteristic on account of the second reagent being flowed through the second channel a predetermined amount of time after the first reagent is flowed through the first channel such that a first incubation time for the first reagent is greater than a second incubation time for the second reagent.

5. The method of claim 1, wherein the microfluidic chip is a first microfluidic chip and the method further comprises:
affixing a second microfluidic chip to the tissue sample after removing the first microfluidic chip such that a plurality of channels of the second microfluidic chip are oriented in a different direction than the plurality of channels of the first microfluidic chip; and
flowing a second plurality of reagents through the plurality of channels of the second microfluidic chip.

6. The method of claim 1, wherein the ranking of the plurality of reagents is further based on a Pearson correlation between a brightness of a first type of optical marking and a brightness of a second type of optical marking.

7. The method of claim 6, wherein the first type of optical marking is generated by a fluorescent DNA stain that marks locations of the tissue sample containing double-stranded DNA.

8. The method of claim 7, wherein the second type of optical marking is generated by applying a linker oligo conjugated with a fluorescent molecule to the tissue sample, which marks locations of the tissue sample with transposition sites.

9. The method of claim 8, wherein the ranking of the plurality of reagents is further based on a probability transposition sites and double-stranded DNA locations overlap each other.

10. The method of claim 7, wherein the second type of optical marking is generated by a fluorescent antibody, which marks locations of the tissue sample that contain a particular type of protein.

11. The method of claim 10, wherein the particular type of protein is a glial fibrillary acidic protein.

12. The method of claim 1, wherein the first reagent includes a first antibody having a first concentration and the second reagent includes the first antibody having a second concentration different than the first concentration.

13. The method of claim 12, wherein optically marking the tissue sample comprises applying a second antibody to the tissue sample, wherein the second antibody is configured to bind with the first antibody and emit a fluorescent light.

14. The method of claim 1, wherein co-registering the first and second images further comprises grouping the plurality of image regions into groups corresponding to each of the plurality of reagents.

15. A non-transitory computer-readable storage medium storing one or more programs, the one or more programs comprising instructions, which when executed by one or more processors of an electronic system, cause the electronic system to:
affix a microfluidic chip having a plurality of channels to a tissue sample such that a first channel of the plurality of channels traverses at least a first region of the tissue sample and a second channel of the plurality of channels traverses at least a second region of the tissue sample;
capture a first image of the microfluidic chip affixed to the tissue sample that shows a position of at least the first channel and the second channel of the plurality of channels relative to the tissue sample;
flow a plurality of reagents through the plurality of channels of the microfluidic chip, wherein flowing the plurality of reagents through the plurality of channels comprises:
flowing a first reagent through the first channel, wherein the first reagent interacts with the first region of the tissue sample; and
flowing a second reagent through the second channel, wherein the second reagent interacts with the second region of the tissue sample, wherein the first reagent differs from the second reagent and/or a first characteristic of the interaction between the first reagent and the first region differs from a second characteristic of the interaction between the second reagent and the second region;
removing the microfluidic chip from the tissue sample;
optically mark the tissue sample to identify a quality of the tissue sample and areas in the tissue sample affected by the flow of the plurality of reagents over the tissue sample;
capture a second image of the tissue sample after removing the microfluidic chip;
co-register the first and second images resulting in a separation of the second image into a plurality of image regions, wherein a first image region of the plurality of image regions is a first portion of the second image that includes the first region of the tissue sample and a second image region of the plurality of image regions is a second portion of the second image that includes the second region of the tissue sample; and
rank a performance of the plurality of reagents with the tissue sample based on at least an average brightness of the optical markings captured in one or more image regions of the second image that correspond to a respective reagent of the plurality of reagents.

16. A non-transitory computer-readable storage medium storing one or more programs, the one or more programs comprising instructions, which when executed by one or more processors of an electronic system, cause the electronic system to:

receive a first image of a microfluidic chip having a plurality of channels that was affixed to a tissue sample such that a first channel of the plurality of channels traverses at least a first region of the tissue sample and a second channel of the plurality of channels traverses at least a second region of the tissue sample;

receive a second image of the tissue sample after:
 a plurality of reagents were flowed through the plurality of channels of the microfluidic chip, wherein flowing the plurality of reagents through the plurality of channels comprised:
  flowing a first reagent through the first channel, wherein the first reagent interacts with the first region of the tissue sample; and
  flowing a second reagent through the second channel, wherein the second reagent interacts with the second region of the tissue sample, wherein the first reagent differs from the second reagent and/or a first characteristic of the interaction between the first reagent and the first region differs from a second characteristic of the interaction between the second reagent and the second region;
 removing the microfluidic chip from the tissue sample; and
 optically marking the tissue sample to identify a quality of the tissue sample and areas in the tissue sample affected by the flow of the plurality of reagents over the tissue sample;

co-register the first and second images resulting in a separation of the second image into a plurality of image regions, wherein a first image region of the plurality of image regions is a first portion of the second image that includes the first region of the tissue sample and a second image region of the plurality of image regions is a second portion of the second image that includes the second region of the tissue sample; and rank a performance of the plurality of reagents with the tissue sample based on at least an average brightness of the optical markings captured in one or more image regions of the second image that correspond to a respective reagent of the plurality of reagents.

\* \* \* \* \*